US012686248B2

(12) United States Patent
Sugawara et al.

(10) Patent No.: US 12,686,248 B2
(45) Date of Patent: Jul. 21, 2026

(54) IN-VEHICLE DEVICE TEMPERATURE ADJUSTMENT APPARATUS

(71) Applicant: MIKUNI CORPORATION, Tokyo (JP)

(72) Inventors: Hideyuki Sugawara, Odawara (JP); Ryuta Sato, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 124 days.

(21) Appl. No.: 18/731,646

(22) Filed: Jun. 3, 2024

(65) Prior Publication Data

US 2024/0399831 A1 Dec. 5, 2024

(30) Foreign Application Priority Data

Jun. 5, 2023 (JP) ................................. 2023-092399

(51) Int. Cl.
B60H 1/04 (2006.01)
B60H 1/00 (2006.01)
G05D 23/20 (2006.01)

(52) U.S. Cl.
CPC .......... B60H 1/04 (2013.01); B60H 1/00571 (2013.01); B60H 1/00885 (2013.01); G05D 23/20 (2013.01); B60H 1/00278 (2013.01)

(58) Field of Classification Search
CPC .. B60H 1/04; B60H 1/00571; B60H 1/00885; B60H 1/00278; G05D 23/20
See application file for complete search history.

(56) References Cited

U.S. PATENT DOCUMENTS

2005/0067158 A1* 3/2005 Ito ...................... B60H 1/00007
165/204

FOREIGN PATENT DOCUMENTS

JP 6079417 2/2017

* cited by examiner

*Primary Examiner* — Jonathan Bradford
(74) *Attorney, Agent, or Firm* — STAAS & HALSEY LLP

(57) ABSTRACT

A temperature adjustment apparatus includes a first temperature adjustment circuit including a first pump to circulate a first heat medium; a second temperature adjustment circuit including a second pump to circulate a second heat medium; and a mixing valve to mix the first and second heat media as a mixed heat medium. The temperature adjustment apparatus calculates a target outflow temperature of the mixed heat medium flowing out to the second temperature adjustment circuit, the ratio of the first heat medium as a flow ratio from rotational speeds of the first and second pumps and an opening degree of the mixing valve, an inflow temperature of the first heat medium and an inflow temperature of the second heat medium from outflow temperatures of the mixed heat medium, an opening degree correction coefficient, a target flow ratio, and a target opening degree of the mixing valve to control the opening degree.

18 Claims, 11 Drawing Sheets

FIG. 2

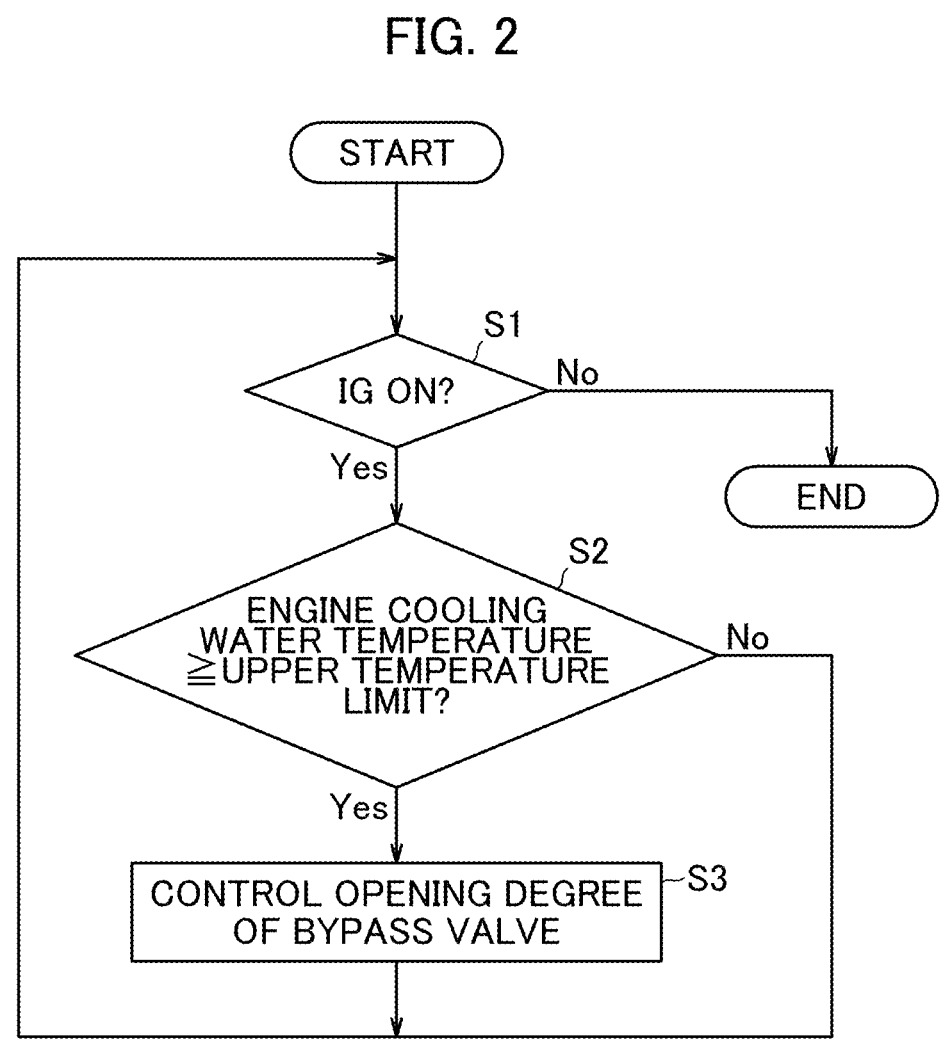

START

S1

IG ON? — No → END

Yes

S2

ENGINE COOLING WATER TEMPERATURE $\geqq$ UPPER TEMPERATURE LIMIT? — No

Yes

CONTROL OPENING DEGREE OF BYPASS VALVE — S3

Figure 7:
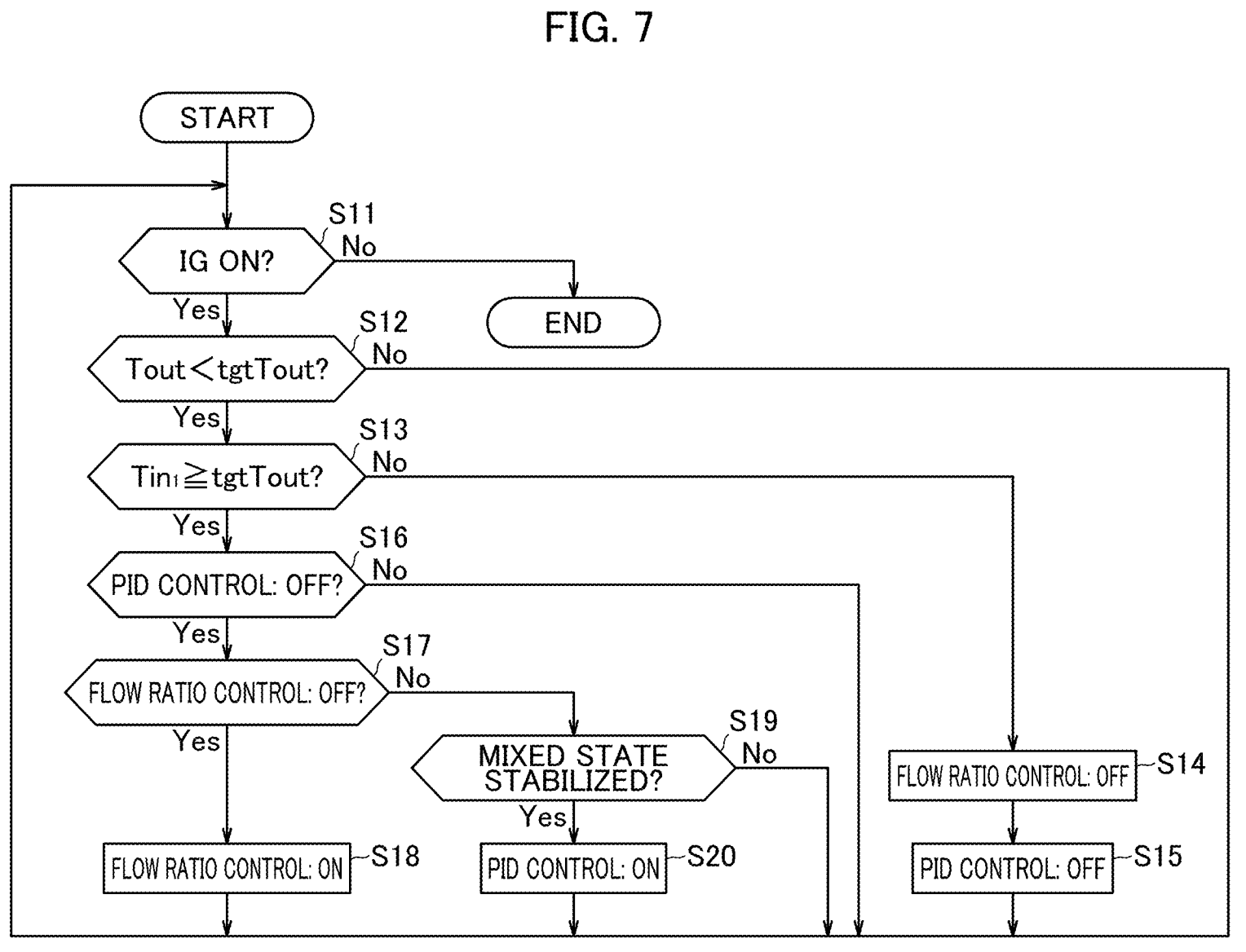

START

S11 — IG ON?
No → END
Yes ↓

S12 — Tout < tgtTout?
No ↓
Yes ↓

S13 — Tin$_i$ ≧ tgtTout?
No ↓
Yes ↓

S16 — PID CONTROL: OFF?
No ↓
Yes ↓

S17 — FLOW RATIO CONTROL: OFF?
No ↓
Yes ↓

S18 — FLOW RATIO CONTROL: ON

S14 — FLOW RATIO CONTROL: OFF

S15 — PID CONTROL: OFF

S19 — MIXED STATE STABILIZED?
No →
Yes ↓

S20 — PID CONTROL: ON

IN-VEHICLE DEVICE TEMPERATURE ADJUSTMENT APPARATUS

CROSS REFERENCE TO RELATED APPLICATIONS

This application claims priority benefit from Japanese Patent Application No. 2023-092399 filed on Jun. 5, 2023 the contents which are incorporated herein by reference.

BACKGROUND OF THE INVENTION

Field of the Invention

The present invention relates to an in-vehicle device temperature adjustment apparatus.

Description of the Related Art

As an in-vehicle device temperature adjustment apparatus, for example, Patent Literature 1 discloses a hybrid vehicle using an engine and a motor as a travel power source, and utilizes the heat of engine cooling water for warming a travel battery that drives a motor during the stoppage of the engine.

The temperature adjustment apparatus includes a switching valve between the cooling water circuit of the engine and the cooling water circuit of the travel battery and enables the exchange of the cooling water between these circuits in response to the switching of the switching valve. For example, when the battery temperature is lower than the warm-up start temperature and requires warm-up, calculation unit calculating, as a target outflow temperature, a target value of the outflow temperature based on at least the temperature of the second in-vehicle device, a flow ratio calculation unit calculating, as a flow ratio, a ratio of the first heat medium contained in the mixed heat medium flowing out from the mixing valve to the second temperature adjustment circuit, based on a rotational speed of the first pump, a rotational speed of the second pump, and the opening degree of the mixing valve, a second inflow temperature calculation unit calculating, as a second inflow temperature, a temperature of the second heat medium flowing in from the second temperature adjustment circuit to the mixing valve, based on the first inflow temperature, the outflow temperature, and the flow ratio, an opening degree correction coefficient calculation unit calculating an opening degree correction coefficient defining a relationship between the flow ratio and the opening degree, based on the flow ratio and the opening degree of the mixing valve, a target flow ratio calculation unit calculating, as a target flow ratio, a target value of the flow ratio based on the first inflow temperature, the second inflow temperature, and the target outflow temperature, a target opening degree calculation unit calculating a target opening degree of the mixing valve based on the opening degree correction coefficient and the target flow ratio, and a valve drive unit performing opening degree control on the mixing valve based on the target opening degree.

As another aspect, the flow ratio calculation unit may calculate the flow ratio based on a relationship between a preset rotational speed ratio of the first pump and the second pump and the opening degree of the mixing valve, and when the flow rate ratio is R, the first inflow temperature is Tin1, the second inflow temperature is Tin2, and the outflow temperature is Tout, the second inflow temperature calculation unit may calculate the second inflow temperature Tin2 in accordance with Equation (6) below:

$$Tin2 = \frac{Tout - Tin1 \times R}{(1 - R)}. \tag{6}$$

As another aspect, when a ratio N1/N2 between the rotational speed N1 of the first pump and the rotational speed N2 of the second pump is x, the flow ratio is R, a ratio R/Rideal between the flow ratio R and an ideal flow ratio Rideal at a time of flow rates of the first heat medium and the second heat medium being equal is y, and preset coefficients are a and b, the flow ratio calculation unit may calculate the ratio y in accordance with Equation (4) below, and calculates the ideal flow ratio Rideal from the opening degree of the mixing valve based on a relationship between a preset opening degree of the mixing valve and the ideal flow ratio Rideal, to calculate the flow ratio R in accordance with Equation (5) below:

$$y = a \times x + b \tag{4}$$

$$R = y \times Rideal, \tag{5}$$

and when the first inflow temperature is Tin1, the second inflow temperature is Tin2, and the outflow temperature is Tout, the second inflow temperature calculation unit May calculate the second inflow temperature Tin2 in accordance with Equation (6) below:

$$Tin2 = \frac{Tout - Tin1 \times R}{(1 - R)}. \tag{6}$$

As another aspect, when a ratio N1/N2 between the rotational speed N1 of the first pump and the rotational speed N2 of the second pump is x, the flow ratio is R, a ratio R/Rideal between the flow ratio R and an ideal flow ratio Rideal at a time of flow rates of the first heat medium and the second heat medium being equal is y, and preset coefficients are c, d, and e, the flow ratio calculation unit may calculate the ratio y in accordance with Equation (7) below, and calculate the ideal flow ratio Rideal from the opening degree of the mixing valve based on a relationship between a preset opening degree of the mixing valve and the ideal flow ratio Rideal, to calculate the flow ratio R in accordance with Equation (5) below:

$$y = cx^2 \times dx + e \tag{7}$$

$$R = y \times Rideal, \tag{5}$$

and when the first inflow temperature is Tin1, the second inflow temperature is Tin2, and the outflow temperature is Tout, the second inflow temperature calculation unit may calculate the second inflow temperature Tin2 in accordance with Equation (6) below:

$$Tin2 = \frac{Tout - Tin1 \times R}{(1 - R)}. \qquad (6)$$

As another aspect, the flow ratio calculation unit may set the ideal flow ratio Rideal as the flow ratio R when the ratio x is 1, and may apply, to Equation (4) above, the coefficients a and b that are each different between a case where x is less than 1 and a case where x is greater than 1.

As another aspect, the flow ratio calculation unit may set the ideal flow ratio Rideal as the flow ratio R when the ratio x is 1, and may apply, to Equation (7), the coefficients c, d, and e that are each different between a case where x is less than 1 and a case where x is greater than 1.

As another aspect, the flow ratio calculation unit may acquire the rotational speed of the first pump and the rotational speed of the second pump from an existing external apparatus.

As another aspect, the target outflow temperature calculation unit, the flow ratio calculation unit, the second inflow temperature calculation unit, the opening degree correction coefficient calculation unit, the target flow ratio calculation unit, the target opening degree calculation unit, and the valve drive unit may repeat their respective processes at predetermined control intervals.

As another aspect, the mixing control unit may further include a stabilization determination unit determining whether a mixed state of the first heat medium and the second heat medium corresponding to the opening degree control of the mixing valve has been stabilized, and a feedback control unit executing feedback control including at least one of an integral term or a differential term, obtained from a deviation between the outflow temperature and the target outflow temperature. The feedback control unit may start the feedback control when the stabilization determination unit determines that the outflow temperature has been stabilized after starting of the opening degree control of the mixing valve.

As another aspect, the mixing control unit may control the opening degree of the mixing valve to warm the second in-vehicle device when the outflow temperature is lower than the target outflow temperature and the first inflow temperature is equal to or higher than the target outflow temperature.

As another aspect, the mixing control unit may control the opening degree of the mixing valve to cool the second in-vehicle device when the outflow temperature is equal to or higher than the target outflow temperature and the first inflow temperature is lower than the target outflow temperature.

As another aspect, one of the first temperature adjustment circuit and the second temperature adjustment circuit may be a powertrain cooling water circuit that adjusts a temperature of a powertrain for causing a vehicle to travel, and the other of the first temperature adjustment circuit and the second temperature adjustment circuit may be a battery cooling water circuit for adjusting a temperature of a travel battery.

As another aspect, one of the first temperature adjustment circuit and the second temperature adjustment circuit may be an air-conditioning core cooling water circuit for adjusting a temperature of an air-conditioning core of a vehicle, and the other of the first temperature adjustment circuit and the second temperature adjustment circuit may be a battery cooling water circuit for adjusting a temperature of a travel battery.

As another aspect, one of the first temperature adjustment circuit and the second temperature adjustment circuit may be an air-conditioning core cooling water circuit for adjusting a temperature of an air-conditioning core of a vehicle, and the other of the first temperature adjustment circuit and the second temperature adjustment circuit may be a powertrain cooling water circuit for adjusting a temperature of a powertrain for causing the vehicle to travel.

As another aspect, the powertrain may be an engine installed in the vehicle as a travel power source.

As another aspect, the powertrain may include a travel motor installed in the vehicle as a travel power source, an inverter for driving the travel motor, and a direct current to direct current (DC-DC) converter.

According to the in-vehicle device temperature adjustment apparatus of the present invention, the heat media circulating in the first and second temperature adjustment circuits, respectively, can be more properly mixed using a mixing valve to effectively utilize the heat media for the temperature control of the in-vehicle device.

BRIEF DESCRIPTION OF THE DRAWINGS

FIG. 2 is a flowchart illustrating a bypass valve switching routine executed by an engine temperature control unit of a controller.

FIG. 6 is a diagram illustrating a control map set based on test results.

FIG. 7 is a flowchart illustrating a mixing valve opening control routine executed by the mixing control unit of the controller.

DETAILED DESCRIPTION OF THE INVENTION

First Embodiment

In the following, a first embodiment will be described, where the present invention is embodied in an in-vehicle device temperature adjustment apparatus installed in a hybrid vehicle.

Figure 1:
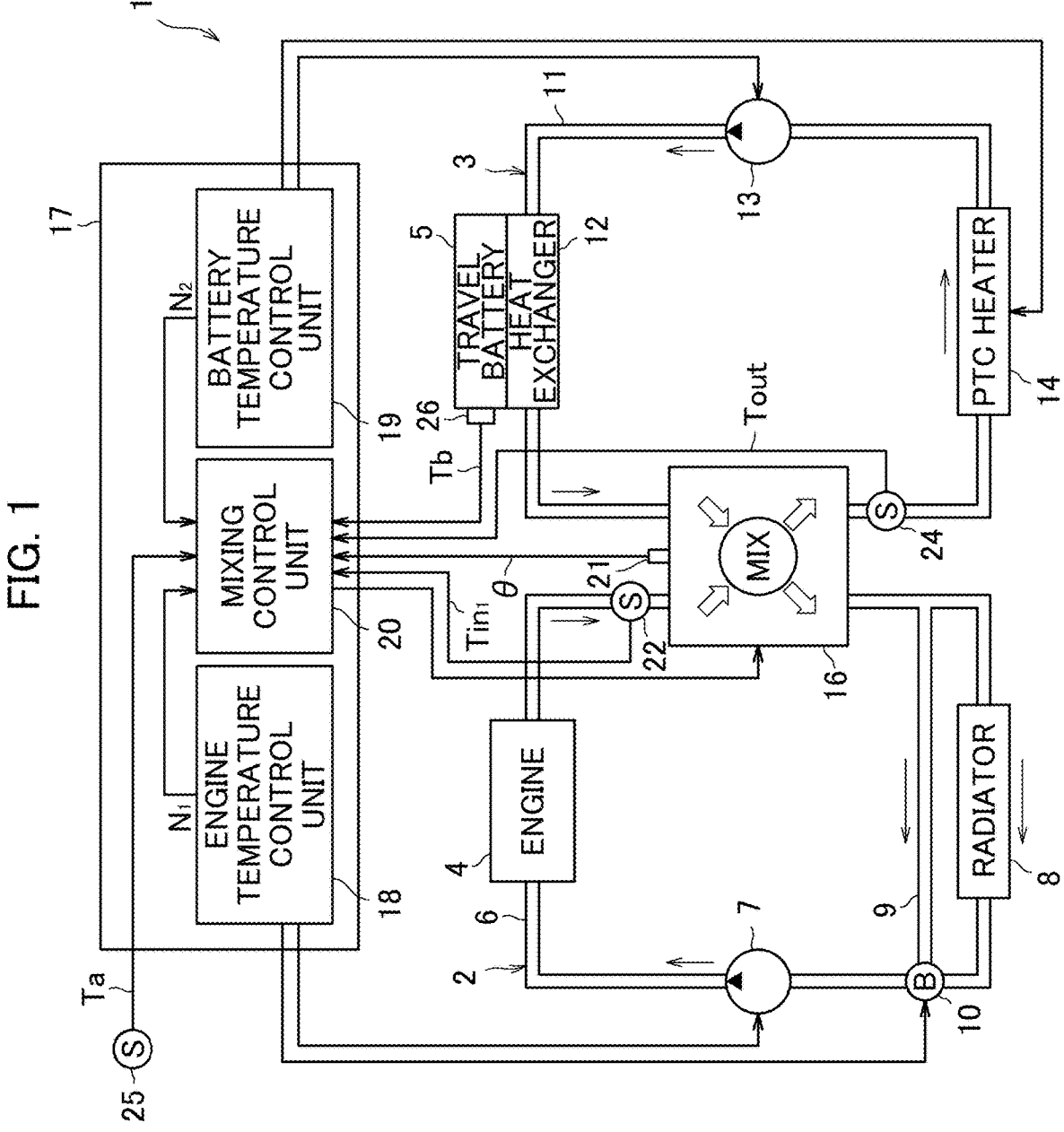
FIG. 1 is a circuit diagram illustrating a temperature adjustment apparatus according to a first embodiment.

FIG. 1 is a circuit diagram illustrating a temperature adjustment apparatus of the present embodiment.

A hybrid vehicle (not illustrated) (hereinafter, sometimes referred to simply as a vehicle) is equipped with an engine and a motor as a travel power source. Although the basic configuration of the hybrid vehicle is well known and will not be described in detail, the vehicle travels while appropriately switching the travel power source according to the driver's accelerator operation, the travel conditions of the vehicle, and other factors. The engine generates heat associated with its operation and needs to be maintained in a temperature range where good exhaust gas performance and fuel consumption performance can be obtained. In addition, the travel battery for driving the motor also generates heat associated with its charge and discharge and needs to be maintained in a temperature range where good charge and discharge performance can be obtained. Thus, a temperature adjustment apparatus 1 illustrated in FIG. 1 is installed in the vehicle, and an engine cooling water circuit 2 thereof adjusts the temperature of an engine 4, and a battery cooling water circuit 3 thereof adjusts the temperature of a travel battery 5.

More specifically, the engine 4, a cooling water pump 7, and a radiator 8 are interposed in an annular flow path 6 of the engine cooling water circuit 2, and the cooling water discharged from the cooling water pump 7 circulates through the flow path 6 as engine cooling water. In the flow path 6, a bypass path 9 is formed to bypass the radiator 8, and a bypass valve 10 is interposed at one end of the bypass path 9. In response to the switching of the bypass valve 10, the cooling water is passed through or bypasses the radiator 8, and during the passage, the cooling water is dissipated by the radiator 8. Such switching of the bypass valve 10 maintains the engine cooling water, and thus the engine 4, in a suitable temperature range.

A battery heat exchanger 12 built in the travel battery 5, a cooling water pump 13, and a positive temperature coefficient (PTC) heater 14 are interposed in the annular flow path 11 of the battery cooling water circuit 3, and the cooling water discharged from the cooling water pump 13 circulates through the flow path 11 as the battery cooling water. During the operation of the PTC heater 14, the temperature of the battery cooling water is appropriately raised, and heat is exchanged between the battery cooling water and the travel battery 5 via the battery heat exchanger 12 to maintain the travel battery 5 in a suitable temperature range.

In the present embodiment, the engine cooling water circuit 2 corresponds to the "first temperature adjustment circuit" and the "powertrain cooling water circuit" of the present invention, the battery cooling water circuit 3 corresponds to the "second temperature adjustment circuit" of the present invention, the engine 4 corresponds to the "first in-vehicle device" and the "powertrain" of the present invention, and the travel battery 5 corresponds to the "second in-vehicle device" of the present invention. The cooling water corresponds to the "heat medium" of the present invention, the engine cooling water corresponds to the "first heat medium" of the present invention, and the battery cooling water corresponds to the "second heat medium" of the present invention. The cooling water pump 7 corresponds to the "first pump" of the present invention, and the cooling water pump 13 corresponds to the "second pump" of the present invention.

The engine cooling water circuit 2 and the battery cooling water circuit 3 are connected to each other via the mixing valve 16, thereby constituting the temperature adjustment apparatus 1. The engine cooling water circulating in the engine cooling water circuit 2 and the battery cooling water circulating in the battery cooling water circuit 3 flow in each case into the mixing valve 16, and then flow out from the mixing valve 16 to the engine cooling water circuit 2 and the battery cooling water circuit 3. When the mixing valve 16 is fully closed, the engine cooling water and the battery cooling water flow out to the cooling water circuits 2, 3 on the original sides without mixing. When the mixing valve 16 is fully opened, the engine cooling water and the battery cooling water flow out to the cooling water circuits 2, 3 on the other sides without mixing. When the mixing valve 16 is between fully closed and fully open, the engine cooling water and the battery cooling water are mixed at a rate corresponding to the opening degree of the mixing valve 16, and then flow out to the cooling water circuits 2, 3 as mixed cooling water. However, the configuration of the mixing valve 16 is not limited to the above, as long as the valve has a function of mixing the cooling water according to the opening degree.

A controller 17 is installed in the vehicle, and this controller 17 includes an engine temperature control unit 18 and a battery temperature control unit 19. The engine temperature control unit 18 controls the bypass valve 10 and the cooling water pump 7 to adjust the temperature of the engine 4. The battery temperature control unit 19 controls the PTC heater 14 and the cooling water pump 13 to adjust the temperature of the travel battery 5. Although each of the control units 18, 19 also has a well-known structure and will not be described in detail, an example of the control of the bypass valve 10 by the engine temperature control unit 18 will be described.

The engine temperature control unit 18 executes a bypass valve switching routine illustrated in FIG. 2 at predetermined control intervals. Note that it is assumed that at the beginning of the routine, the bypass valve 10 is switched to the bypass path side. First, in step S1, the engine temperature control unit 18 determines whether the ignition switch of the vehicle has been turned on, and ends the routine when making a No (negative) determination. When the determination in step S1 is Yes (affirmative), the process proceeds to step S2 to determine whether the engine cooling water temperature is equal to or higher than a preset upper temperature limit. Here, an engine-side inflow temperature Tin1, which will be described later, may be applied as the engine cooling water temperature. When the determination is No, the process returns to step S1, and the processes of steps S1 and S2 are repeated. This holds the bypass valve 10 on the bypass path 9 side, whereby the engine cooling water circulates in the engine cooling water circuit 2 without being cooled by the radiator 8.

The engine cooling water temperature gradually rises due to the heat received from the engine 4, and when the determination in step S2 becomes Yes, the engine temperature control unit 18 proceeds to step S3 and controls the opening degree of the bypass valve 10 to the radiator 8 side. At this time, the bypass valve 10 is controlled so that, for example, the larger the deviation between the engine cooling water temperature and the upper temperature limit, the greater the increase in the opening area of the bypass valve 10 on the radiator 8 side. Then, when heat dissipation by the radiator 8 gradually lowers the engine cooling water temperature, the opening area of the bypass valve 10 on the radiator 8 side gradually decreases accordingly by the process of step S3. When the determination of step S2 turns from Yes to No, the bypass valve 10 is returned to the initial switching state to the bypass path 9 side. This routine is repeated to hold the engine 4 in the suitable temperature range.

In addition to the above control, the controller 17 of the present embodiment controls the opening degree of the mixing valve 16 to utilize the heat of the engine cooling water for warming the travel battery 5. Hereinafter, this control is referred to as an opening degree control of the mixing valve 16, and the control is executed by a mixing control unit 20 provided in the controller 17.

Figure 3:
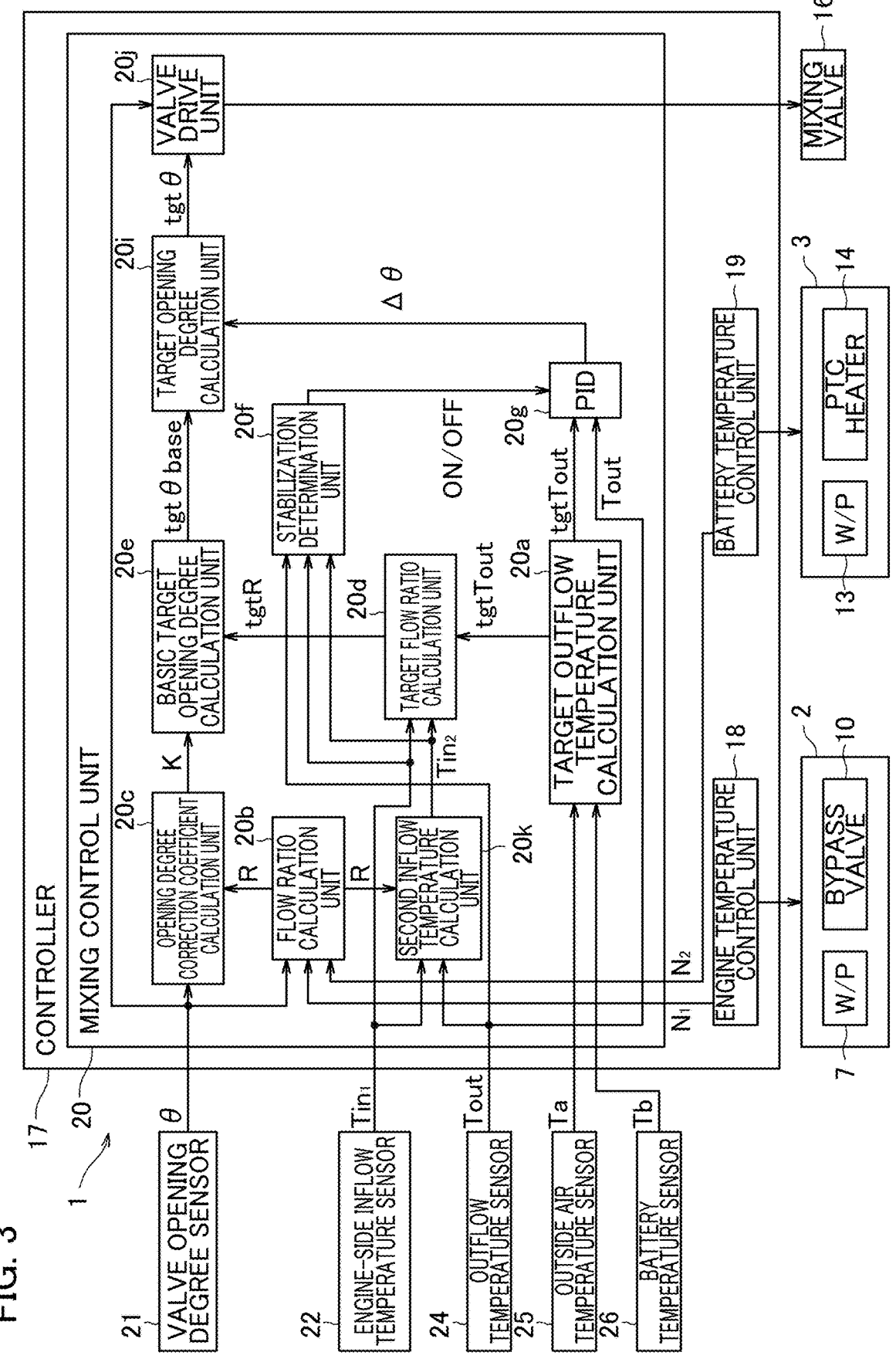
FIG. 3 is a block diagram illustrating the functional configuration of the controller.

FIG. 3 is a block diagram illustrating the functional configuration of the controller 17.

As illustrated in FIGS. 1 and 3, various sensors are connected to the input side of the controller 17, including: a valve opening degree sensor 21 that detects an opening degree 0 of the mixing valve 16; an engine-side inflow temperature sensor 22 that detects the temperature of the engine cooling water flowing from the engine cooling water circuit 2 into the mixing valve 16 as the engine-side inflow temperature Tin1; an outflow temperature sensor 24 that detects the temperature of the mixed cooling water flowing from the mixing valve 16 to the battery cooling water circuit 3 as an outflow temperature Tout; an outside air temperature sensor 25 that detects an outside air temperature Ta; and a battery temperature sensor 26 that detects a temperature Tb of the travel battery 5.

In the present embodiment, the valve opening degree sensor 21 corresponds to the "valve opening degree detection unit" of the present invention, and the engine-side inflow temperature sensor 22 that detects the engine-side inflow temperature Tin1 corresponds to "the first inflow temperature detection unit detecting the first inflow temperature" of the present invention. The outflow temperature sensor 24 that detects the outflow temperature Tout of the mixed cooling water flowing out to the battery cooling water circuit 3 corresponds to "the outflow temperature detection unit detecting the outflow temperature of the mixed heat medium" of the present invention.

Further, various devices are connected to the output side of the controller 17, including the mixing valve 16, the cooling water pump 7 and the bypass valve 10 of the engine cooling water circuit 2, the cooling water pump 13 of the battery cooling water circuit 3, and the PTC heater 14. As described above, the engine temperature control unit 18 controls the cooling water pump 7 and the bypass valve 10, and the battery temperature control unit 19 controls the cooling water pump 13 and the PTC heater 14.

The mixing control unit 20 of the controller 17 includes a target outflow temperature calculation unit 20a, a flow ratio calculation unit 20b, a second inflow temperature calculation unit 20k, an opening degree correction coefficient calculation unit 20c, a target flow ratio calculation unit 20d, a basic target opening degree calculation unit 20e, a stabilization determination unit 20f, a PID control unit 20g, a target opening degree calculation unit 201, and a valve drive unit 20j. The PID control unit 20g corresponds to the feedback control unit of the present invention.

The target outflow temperature calculation unit 20a calculates a target outflow temperature tgtTout as the target value of the outflow temperature Tout, which can hold the travel battery 5 in the suitable temperature range, based on the outside air temperature Ta detected by the outside air temperature sensor 25 and the battery temperature Tb detected by the battery temperature sensor 26. This calculation process is performed based on, for example, a control map that defines the relationship between the outside air temperature Ta, the battery temperature Tb, and the target outflow temperature tgtTout. Here, the target outflow temperature tgtTout is not necessarily based on the outside air temperature Ta and the battery temperature Tb, and may be calculated based on the battery temperature Tb, for example.

Based on the rotational speed N1 of the cooling water pump 7 of the engine cooling water circuit 2, the rotational speed N2 of the cooling water pump 13 of the battery cooling water circuit 3, and the opening degree 0 of the mixing valve 16 detected by the valve opening degree sensor 21, the flow ratio calculation unit 20b calculates the flow ratio R as the ratio of the engine cooling water contained in the mixed cooling water flowing out from the mixing valve 16 to the battery cooling water circuit 3. In the present embodiment, information on the rotational speed N1 is input from the engine temperature control unit 18 that controls the cooling water pump 7, and information on the rotational speed N2 is input from the battery temperature control unit 19 that controls the cooling water pump 13. However, the present invention is not limited to this, and for example, each of the cooling water pumps 7, 13 may be equipped with a rotational speed sensor to detect their respective rotational speeds N1 and N2.

The second inflow temperature calculation unit 20k calculates the temperature of the battery cooling water flowing from the battery cooling water circuit 3 into the mixing valve 16 as a battery-side inflow temperature Tin2, based on the engine-side inflow temperature Tin1, the outflow temperature Tout, and the flow ratio R calculated by the flow ratio calculation unit 20b. The process of each of the flow ratio calculation unit 20b and the second inflow temperature calculation unit 20k is one of the gist of the present invention, and hence the details thereof will be described later.

Based on the flow ratio R calculated by the flow ratio calculation unit 20b and the opening degree 0 of the mixing valve 16, the opening degree correction coefficient calculation unit 20c calculates an opening degree correction coefficient K, which defines the relationship between the flow ratio R and the opening degree 0 of the mixing valve 16, according to the following Equation (1):

$$K = \frac{\theta}{R}. \tag{1}$$

Based on the engine-side inflow temperature Tin1, the battery-side inflow temperature Tin2, and the target outflow temperature tgtTout calculated by the target outflow temperature calculation unit 20a, the target flow ratio calculation unit 20d calculates a target flow ratio tgtR as the target value of the flow ratio R for achieving the target outflow temperature tgtTout according to the following Equation (2):

$$tgtR = \frac{(tgtTout - Tin2)}{(Tin1 - Tin2)} \tag{2}$$

Based on the opening degree correction coefficient K calculated by the opening degree correction coefficient calculation unit 20c and the target flow ratio tgtR, the basic target opening degree calculation unit 20e calculates a basic target opening degree tgtθbase as the target value of the opening degree 0 of the mixing valve 16 for achieving the target outflow temperature tgtTout according to the following Equation (3):

$$tgt\theta base = K \times tgtR. \tag{3}$$

The stabilization determination unit 20*f* determines whether the mixed state of the engine cooling water and the battery cooling water according to the opening degree θ of the mixing valve 16 has been stabilized. More specifically, the stabilization determination unit 20*f* determines that the mixed state has been stabilized when the engine-side inflow temperature Tin1, the battery-side inflow temperature Tin2, and the outflow temperature Tout each fall within a predetermined fluctuation range over a predetermined period of time. Here, the determination that the mixed state has been stabilized is not necessarily based on each of the temperatures Tin1, Tin2, and Tout, and may be made when, for example, the fluctuation state of the outflow temperature Tout falls within a predetermined fluctuation range over a predetermined period of time.

When the stabilization determination unit 20*f* determines that the temperatures Tin1, Tin2, and Tout are stabilized, the PID control unit 20*g* calculates a basic water temperature deviation as the deviation between the outflow temperature Tout and the target outflow temperature tgtTout. Then, an opening degree correction amount 40 is calculated based on a proportional term P, an integral term I, and a differential term D obtained from the basic water temperature deviation.

The target opening degree calculation unit 201 adds the opening degree correction amount 40 calculated by the PID control unit 20*g* to the basic target opening degree tgtθbase calculated by the basic target opening degree calculation unit 20*e* to calculate a target opening degree tgtθ. When the stabilization determination unit 20*f* does not determine that the mixed state has been stabilized, the PID control unit 20*g* does not calculate a water temperature deviation ΔT, and the target opening degree calculation unit 20*i* sets the basic target opening degree tgtθbase as the target opening degree tgtθ. Therefore, in this case, PID control based on the water temperature deviation ΔT is discontinued.

The valve drive unit 20*j* drives and controls the mixing valve 16 based on the deviation between the target opening degree tgtθ and the opening degree θ of the mixing valve 16 so that the opening degree θ becomes equal to the target opening degree tgtθ.

In addition to the opening degree control of the mixing valve 16, the mixing control unit 20 also executes, for example, a control for raising the temperature of the travel battery 5 by holding the mixing valve 16 fully open to cause the engine cooling water to flow out to the battery cooling water circuit 3, as in the technique of Patent Literature 1. However, since this is not directly related to the gist of the present invention, the detailed description thereof will be omitted.

Next, the processes of the flow ratio calculation unit 20*b* and the second inflow temperature calculation unit 20*k* will be described in detail.

As described above, the target flow ratio calculation unit 20*d* requires information on the battery-side inflow temperature Tin2 to calculate the target flow ratio tgtR. On this account, for example, it is also possible to add a battery-side inflow temperature sensor to the inflow port of the mixing valve 16 on the battery cooling water circuit 3 side to detect the battery-side inflow temperature Tin2. However, the addition of the battery-side inflow temperature sensor may cause the manufacturing cost of the temperature adjustment apparatus 1 to soar.

Therefore, the flow ratio calculation unit 20*b* and the second inflow temperature calculation unit 20*k* play the following roles: calculating the battery-side inflow temperature Tin2 by acquiring information on the rotational speeds N1 and N2 of the cooling water pumps 7, 13 from the existing engine temperature control unit 18 and battery temperature control unit 19 and using the information; and calculating the flow ratio R in association with the calculation of the battery-side inflow temperature Tin2. As a result, the battery-side inflow temperature sensor is omitted, thereby achieving cost reduction of the temperature adjustment apparatus 1. The engine temperature control unit 18 and the battery temperature control unit 19 correspond to the "existing external apparatus" of the present invention.

The details of the processes of the flow ratio calculation unit 20*b* and the second inflow temperature calculation unit 20*k* are set based on the following knowledge.

The present inventor has found that when the relationship between the opening degree θ of the mixing valve 16 and the flow ratio R has a linear characteristic, a positive correlation holds between the ratio R/θ and the rotational speed ratio N1/N2 of the cooling water pumps 7, 13. Therefore, in this case, the flow ratio calculation unit 20*b* can calculate the flow ratio R based on the relationship between the preset rotational speed ratio N1/N2 and the opening degree θ of the mixing valve 16, and the second inflow temperature calculation unit 20*k* can calculate the battery-side inflow temperature Tin2 using the flow ratio R. Such an aspect is also included in the present invention.

However, when the mixing valve 16 has a nonlinear opening degree characteristic, that is, when the relationship between the opening degree θ and the flow ratio R is nonlinear, it is necessary to correct the opening degree characteristic to a linear opening degree characteristic. For convenience of description, the flow ratio R is defined as an ideal flow ratio Rideal when the flow rate of the engine cooling water circulating in the engine cooling water circuit 2, in other words, the flow rate of the engine cooling water flowing into the mixing valve 16, and the flow rate of the battery cooling water circulating in the battery cooling water circuit 3, in other words, the flow rate of the battery cooling water flowing into the mixing valve 16, are equal.

Figure 11:
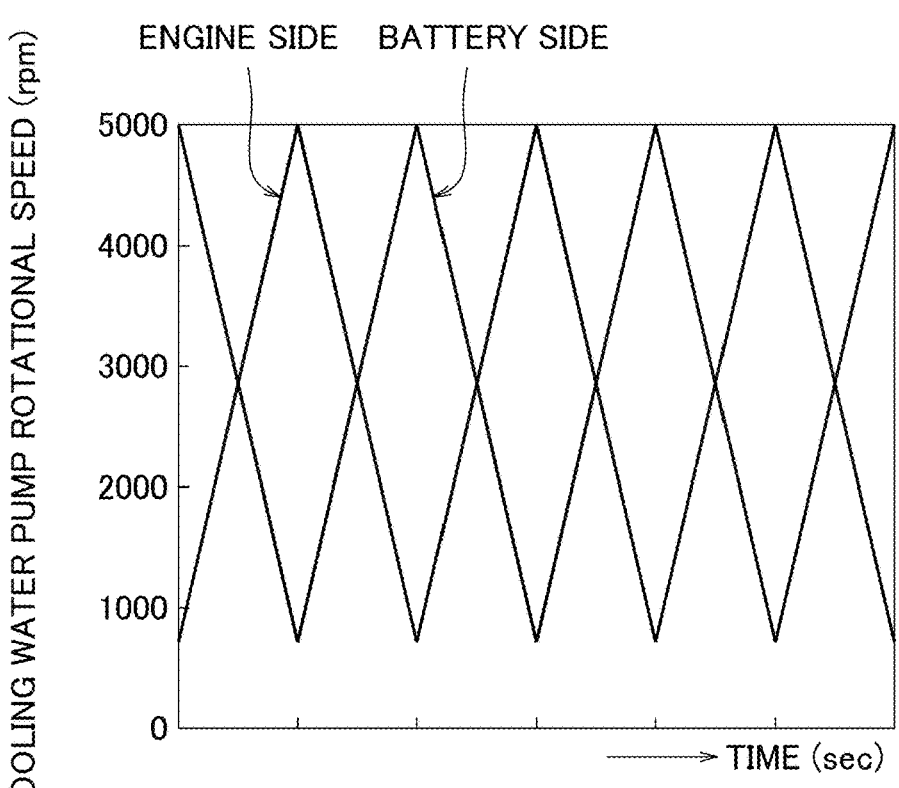
FIG. 11 is a time chart illustrating test conditions regarding a rotational speed of a cooling water pump.

The present inventor created operating conditions with the rotational speed ratio N1/N2=0.10 to 7.00 by changing the rotational speeds of the cooling water pumps 7, 13 on the engine side and the battery side, respectively, and conducted a test for measuring the ratio R/Rideal between the flow ratio R and the ideal flow ratio Rideal. At this time, the cooling water pumps 7, 13 are controlled so that the rotational speeds N1 and N2 periodically fluctuate in mutually opposite directions, for example, as illustrated in FIG. 11 to be described later.

Figure 4:
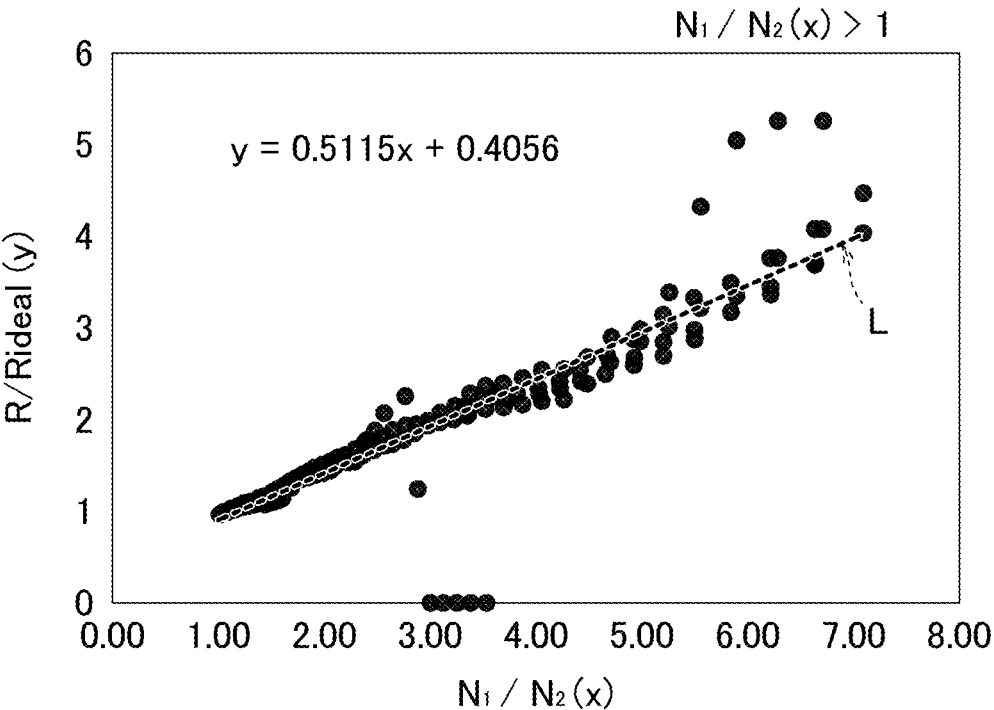
FIG. 4 is a characteristic diagram illustrating test results when a rotational speed ratio N1/N2>1.
Figure 5:
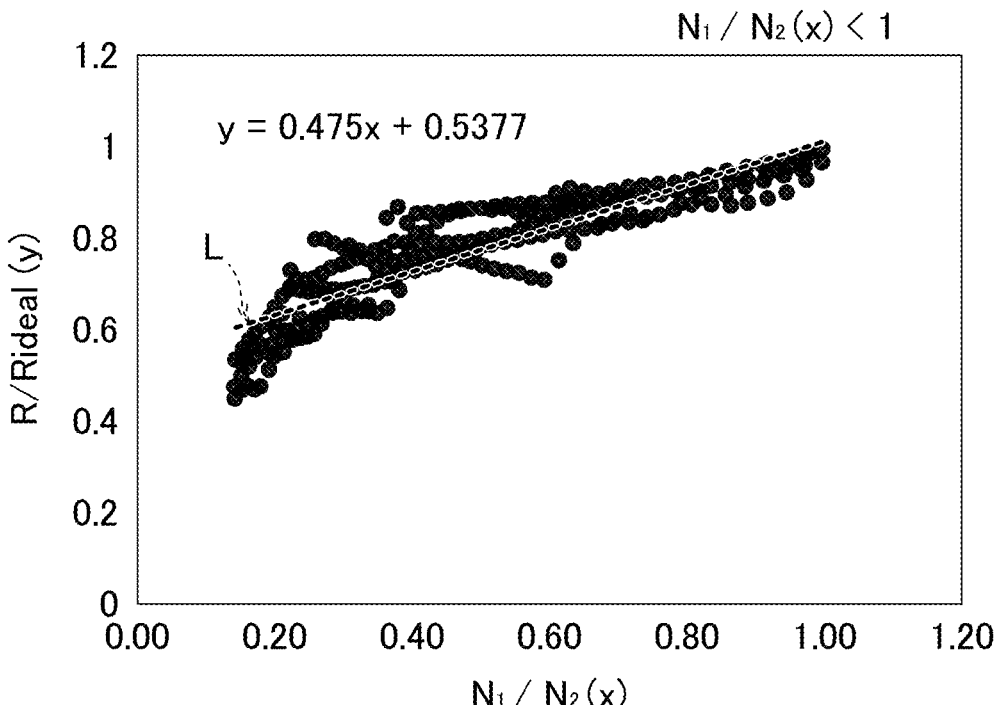
FIG. 5 is a characteristic diagram illustrating test results when the rotational speed ratio N1/N2<1.

FIG. 4 is a characteristic diagram illustrating test results when the rotational speed ratio N1/N2>1, and FIG. 5 is a characteristic diagram illustrating test results when the rotational speed ratio N1/N2<1.

In each of the figures, it is understood that a positive linear correlation holds between the rotational speed ratio N1/N2 and the ratio R/Rideal, which is represented by a linear characteristic line L indicated by a dotted line in each figure. When the rotational speed ratio N1/N2 is x and the ratio R/Rideal is y, these characteristic lines L can be approximated using the following Equation (4). Accordingly, the ratio R/Rideal can be calculated from the rotational speed ratio N1/N2 according to this Equation (4):

$$y = a \times x + b. \tag{4}$$

Since each characteristic line L has a different slope and intercept, it can be seen that the correlation between the rotational speed ratio N1/N2 and the ratio R/Rideal changes across the boundary of the rotational speed ratio N1/N2=1. Specifically, in the specification of the mixing valve 16 of the present embodiment, a=0.5115 and b=0.4056 are applied to the above Equation (4) when x>1, and a=0.475 and b=0.5377 are applied to the above Equation (4) when x<1. Therefore, two types of coefficients a and b are stored in advance in the storage area of the controller 17.

Meanwhile, the present inventor conducted a test to measure the flow ratio R, that is, the ideal flow ratio Rideal, by changing the opening degree 0 of the mixing valve 16 after making the cooling water flow rates on the engine cooling water circuit 2 side and the battery cooling water circuit 3 side equal.

Figure 6:
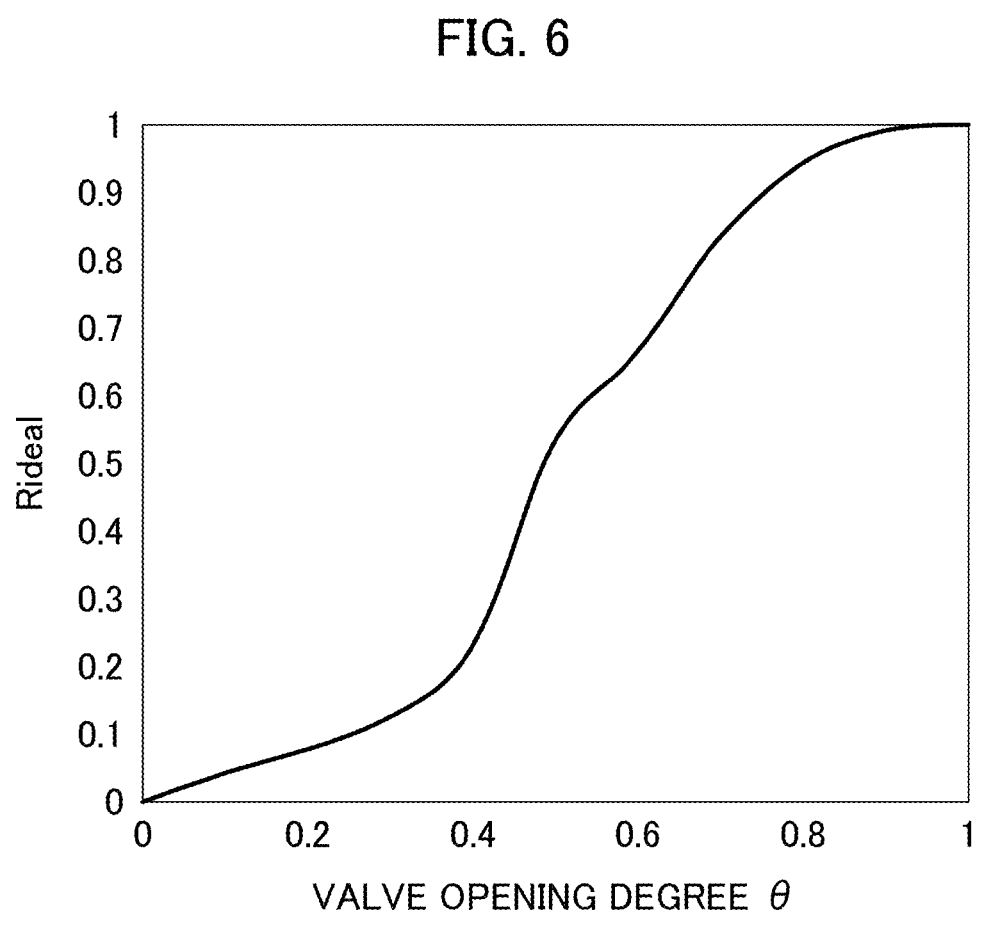

FIG. 6 is a diagram illustrating a control map set based on the test results, and this control map is stored in the storage area of the controller 17 in advance. Accordingly, the ideal flow ratio Rideal can be calculated from the current opening degree 0 of the mixing valve 16 based on the control map.

Using the coefficients a and b set through the above process and the control map, the flow ratio calculation unit 20*b* calculates the flow ratio R as the ratio of the engine cooling water contained in the mixed cooling water flowing out from the mixing valve 16 to the battery cooling water circuit 3.

That is, the rotational speed ratio N1/N2 of the cooling water pumps 7, 13 acquired from the engine temperature control unit 18 and the battery temperature control unit 19 is set to x. From the two types of coefficients a and b in the storage area, the values of the type corresponding to x are selected and read out, and then applied to the above Equation (4) to calculate y, that is, the ratio R/Rideal between the flow ratio R and the ideal flow ratio Rideal. At the same time, the control map of FIG. 6 is used to calculate the ideal flow ratio Rideal from the opening degree 0 of the mixing valve 16 detected by the valve opening degree sensor 21. Then, the flow ratio R is calculated from y and the ideal flow ratio Rideal according to the following Equation (5):

$$R = y \times Rideal. \tag{5}$$

Depending on the specification of the mixing valve 16, the substantially same correlation between the rotational speed ratio N1/N2 and the ratio R/Rideal may be maintained in all the regions of the rotational speed ratio N1/N2. In this case, it is not necessary to switch the coefficients a and b, and the same coefficients a and b may thus be applied.

The second inflow temperature calculation unit 20*k* calculates the battery-side inflow temperature Tin2 according to the following Equation (6) from the engine-side inflow temperature Tin1 detected by the engine-side inflow temperature sensor 22, the outflow temperature Tout detected by the outflow temperature sensor 24, and the flow ratio R calculated by the flow ratio calculation unit 20*b* according to the Equation (5):

$$Tin2 = \frac{Tout - Tin1 \times R}{(1 - R)}. \tag{6}$$

The above Equation (4) assumes that the linear correlation between the rotational speed ratio N1/N2 and the ratio R/Rideal holds. However, as a result of a prior test, a nonlinear correlation may hold between the rotational speed ratio N1/N2 and the ratio R/Rideal. Since the characteristic line L in this case can be approximated according to the following Equation (7), the flow ratio calculation unit 20*b* calculates the ratio R/Rideal from the rotational speed ratio N1/N2 according to this Equation (7) using the coefficients c, d, and e set and stored in advance.

In this case as well, when the relationship between the rotational speed ratio N1/N2 and the ratio R/Rideal changes across the boundary of the rotational speed ratio N1/N2=1, two types of coefficients c, d, and e corresponding to the respective cases of change are set and stored in advance, and the values of the type corresponding to the rotational speed ratio N1/N2 are applied to the following Equation (7). Note that the subsequent processes of calculating the flow ratio R and calculating the battery-side inflow temperature Tin2 by the second inflow temperature calculation unit 20*k* are the same as those described above.

$$y = cx^2 \times dx + e \tag{7}$$

Further, for example, in the characteristic line L illustrated in FIG. 5, a region where the rotational speed ratio N1/N2 is 0.20 or less can be interpreted as nonlinear. In this case, the above Equation (4) may be applied to the calculation process of the ratio R/Rideal in the region of N1/N2>0.20, and the above Equation (7) may be applied to the calculation process of the ratio R/Rideal in the region of N1/N2<0.20.

The mixing control unit 20 of the controller 17 configured as described above executes a mixing valve opening control routine illustrated in FIG. 7 at predetermined control intervals. This routine is executed regardless of whether the engine 4 is running or stopped, and is executed in parallel with the control by the engine temperature control unit 18 when the engine 4 is running. The routine may be executed in parallel with the control by the battery temperature control unit 19. For convenience of description, it is assumed that the mixing valve 16 at the beginning of the routine is kept fully closed.

First, in step S11, the mixing control unit 20 determines whether the ignition switch of the vehicle has been turned on, and ends the routine when making a No determination. When the determination in step S11 becomes Yes, the process proceeds to step S12 to determine whether the outflow temperature Tout is less than the target outflow temperature tgtTout, and when the determination is No, the warming of the travel battery 5 is regarded as unnecessary, and the flow returns to step S11. When the determination in step S12 becomes Yes, due to the requirement of warming the travel battery 5, the process proceeds to step S13 to determine whether the engine-side inflow temperature Tin1 is equal to or higher than the target outflow temperature tgtTout, in other words, whether the engine cooling water has enough heat to warm the travel battery 5. When the determination is No, flow ratio control is turned off in step S14, PID control is turned off in the following step S15, and the process returns to step S11.

Flow ratio control is executed mainly by the target outflow temperature calculation unit 20*a*, the flow ratio calculation unit 20*b*, the opening degree correction coefficient calculation unit 20*c*, the target flow ratio calculation unit 20*d*, the basic target opening degree calculation unit 20*e*, and the valve drive unit 20*j*. This is a process of controlling the opening degree of the mixing valve 16 based on the calculated basic target opening degree tgtθbase, and the details of which will be described later. PID control is mainly executed by the PID control unit 20g, and its process is a PID control process based on the water temperature deviation ΔT. Accordingly, when the determination in step S13 is No, neither flow ratio control nor PID control is executed, and the mixing valve 16 is kept fully closed, whereby the cooling water is circulated individually in the engine cooling water circuit 2 and the battery cooling water circuit 3.

When the determination in step S13 becomes Yes, the process proceeds to step S16 to determine whether PID control has been turned off. At the beginning of the routine, PID control has been turned off in step S15, so that a Yes determination is made, and the process proceeds to step S17. In step S17, it is determined whether flow ratio control has been turned off, and a Yes determination is made because flow ratio control has been turned off in step S14, and flow ratio control is turned on in step S18. Then, the process returns to step S11.

When the process proceeds to step S17 again, a No determination is made because flow ratio control has been turned on. In step S19, it is determined whether the mixed state of the engine cooling water and the battery cooling water has been stabilized. The process of step S19 is executed by the stabilization determination unit 20f in FIG. 3. When flow ratio control is started, the mixing of the engine cooling water and the battery cooling water is started according to the opening degree θ of the mixing valve 16, and the mixed state, in other words, the flow ratio R, which fluctuated at the beginning, is gradually stabilized. Therefore, before the stabilization of the mixed state at the beginning of flow ratio control, the processes of steps S11 to 13, 16, 17, and 19 are repeated based on the No determination in step S19. Since flow ratio control has already been turned on in step S18, only flow ratio control is continuously executed at this time.

When the mixed state of the engine cooling water and the battery cooling water is stabilized, the determination in step S19 turns to Yes, and the process proceeds to step S20. In step S20, PID control is turned on, and then the process returns to step S11. When the process proceeds to step S16 again, a No determination is made because PID control has been turned on, and the processes of steps S11 to 13 and 16 are repeated. Therefore, after the mixed state is stabilized, PID control is continuously executed in parallel with flow ratio control.

Figure 8:
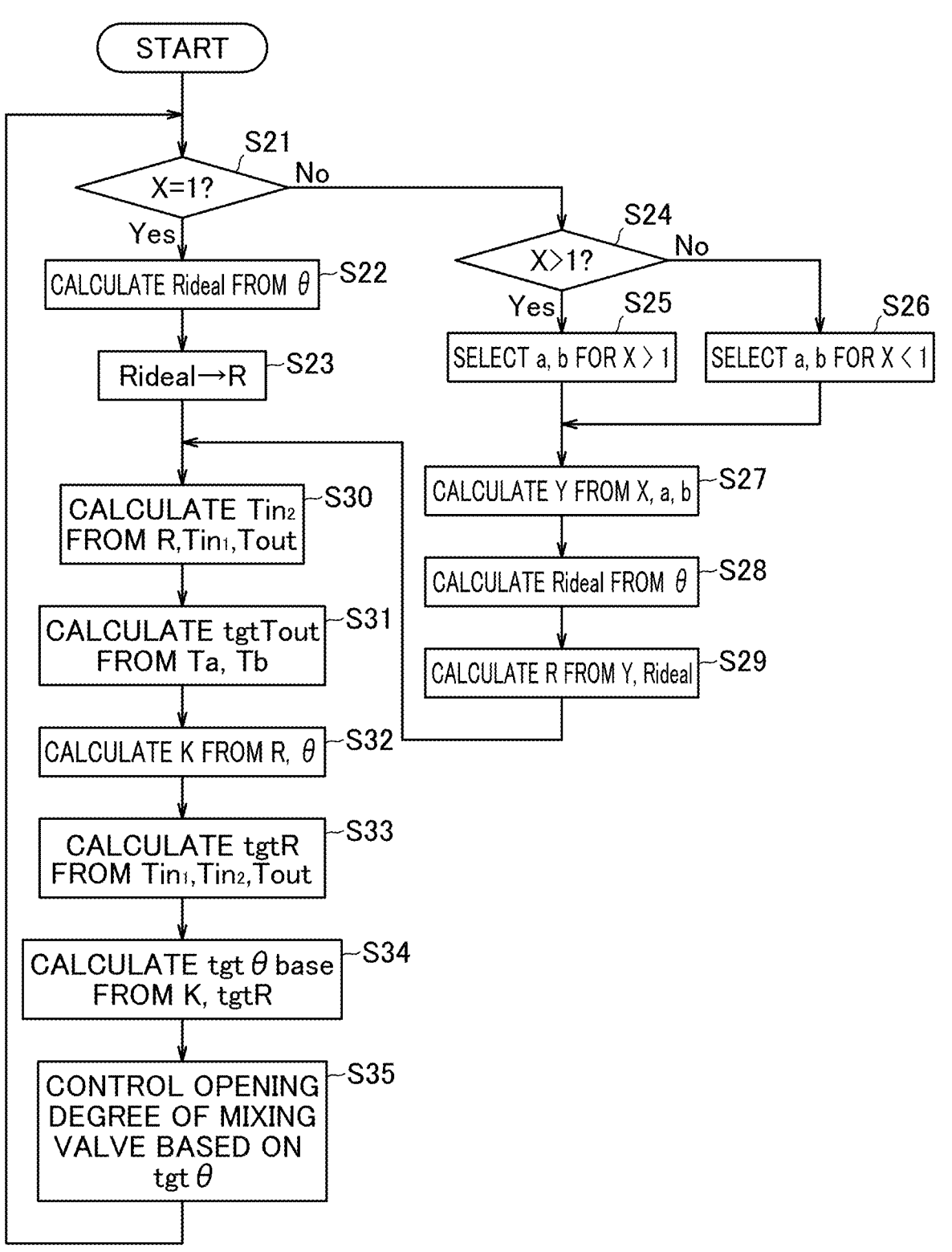
FIG. 8 is a flowchart illustrating a flow ratio control routine executed by the mixing control unit of the controller.

Meanwhile, during the period when flow ratio control is on in step S18, the mixing control unit 20 executes a flow ratio control routine illustrated in FIG. 8 at predetermined control intervals.

First, in step S21, the mixing control unit 20 determines whether the rotational speed ratio N1/N2 of the cooling water pumps 7, 13, that is, x is 1 (x=1). When the determination is Yes, the process proceeds to step S22 to calculate the ideal flow ratio Rideal from the opening degree θ of the mixing valve 16 based on the control map of FIG. 6. In the following step S23, the ideal flow ratio Rideal is set as the flow ratio R, and then the process proceeds to step S30. Since the rotational speed ratio N1/N2=1, the subsequent process is executed based on the ideal flow ratio Rideal.

When the determination in step S21 is No, the process proceeds to step S24 to determine whether x is greater than 1 (x>1). When the determination in step S24 is Yes, the process proceeds to step S25 to select and read the coefficients a and b corresponding to X>1. When the determination in step S24 is No (x<1), the process proceeds to step S26 to select and read the coefficients a and b corresponding to x<1.

In the following step S27, y, that is, the ratio R/Rideal between the flow ratio R and the ideal flow ratio Rideal, is calculated from x and the coefficients a and b according to the above Equation (4). Thereafter, the process proceeds to step S28 to calculate the ideal flow ratio Rideal from the opening degree θ of the mixing valve 16 using the control map of FIG. 6 and calculate the flow ratio R from y and the ideal flow ratio Rideal according to the above Equation (5) in step S29, and then the process proceeds to step S30. The above processes of steps S21 to S29 are executed by the flow ratio calculation unit 20b in FIG. 3.

In step S30, the battery-side inflow temperature Tin2 is calculated from the engine-side inflow temperature Tin1, the outflow temperature Tout, and the flow ratio R according to the above Equation (6). This process is executed by the second inflow temperature calculation unit 20k in FIG. 3.

In the following step S31, the target outflow temperature tgtTout is calculated from the outside air temperature Ta and the battery temperature Tb using a control map (not illustrated). In step S32, the opening degree correction coefficient K is calculated according to the above Equation (1) based on the flow ratio R and the opening degree θ of the mixing valve 16. In step S33, the target flow ratio tgtR is calculated according to the above Equation (2) based on the engine-side inflow temperature Tin1, the battery-side inflow temperature Tin2, and the target outflow temperature tgt-Tout. In step S34, the basic target opening degree tgtθbase is calculated according to the above Equation (3) based on the opening degree correction coefficient K and the target flow ratio tgtR. In the following step S35, the opening degree of the mixing valve 16 is controlled based on the target opening degree tgtθ.

The process of step S31 is executed by the target outflow temperature calculation unit 20a in FIG. 3, the process of step S32 is executed by the opening degree correction coefficient calculation unit 20c in FIG. 3, the process of step S33 is executed by the target flow ratio calculation unit 20d in FIG. 3, the process of step S34 is executed by the basic target opening degree calculation unit 20e in FIG. 3, and the process of step S35 is executed by the valve drive unit 20j in FIG. 3.

Since PID control is turned off before the stabilization of the mixed state of the engine cooling water and the battery cooling water, the basic target opening degree tgtθbase calculated in step S34 is set as the target opening degree tgtθ and applied to the opening degree control of the mixing valve 16 in step S35. When PID control is started before the stabilization of the mixed state, there is a possibility that the essential flow ratio control may not be properly executed due to interference between the two controls. To prevent such a situation, PID control waits until the mixed state is stabilized. After the mixed state has been stabilized, PID control is executed in parallel with flow ratio control, and in step S35, the target opening degree tgtθ, obtained by adding the opening degree correction amount 40 based on PID control to the basic target opening degree tgtθbase, is applied to the opening degree control of the mixing valve 16.

Then, using the above control, the opening degree θ of the mixing valve 16 is adjusted to the target opening degree tgtθ, and the battery cooling water circulating in the battery cooling water circuit 3 is mixed with the engine cooling water and adjusted to the target outflow temperature tgtTout.

Figure 9:
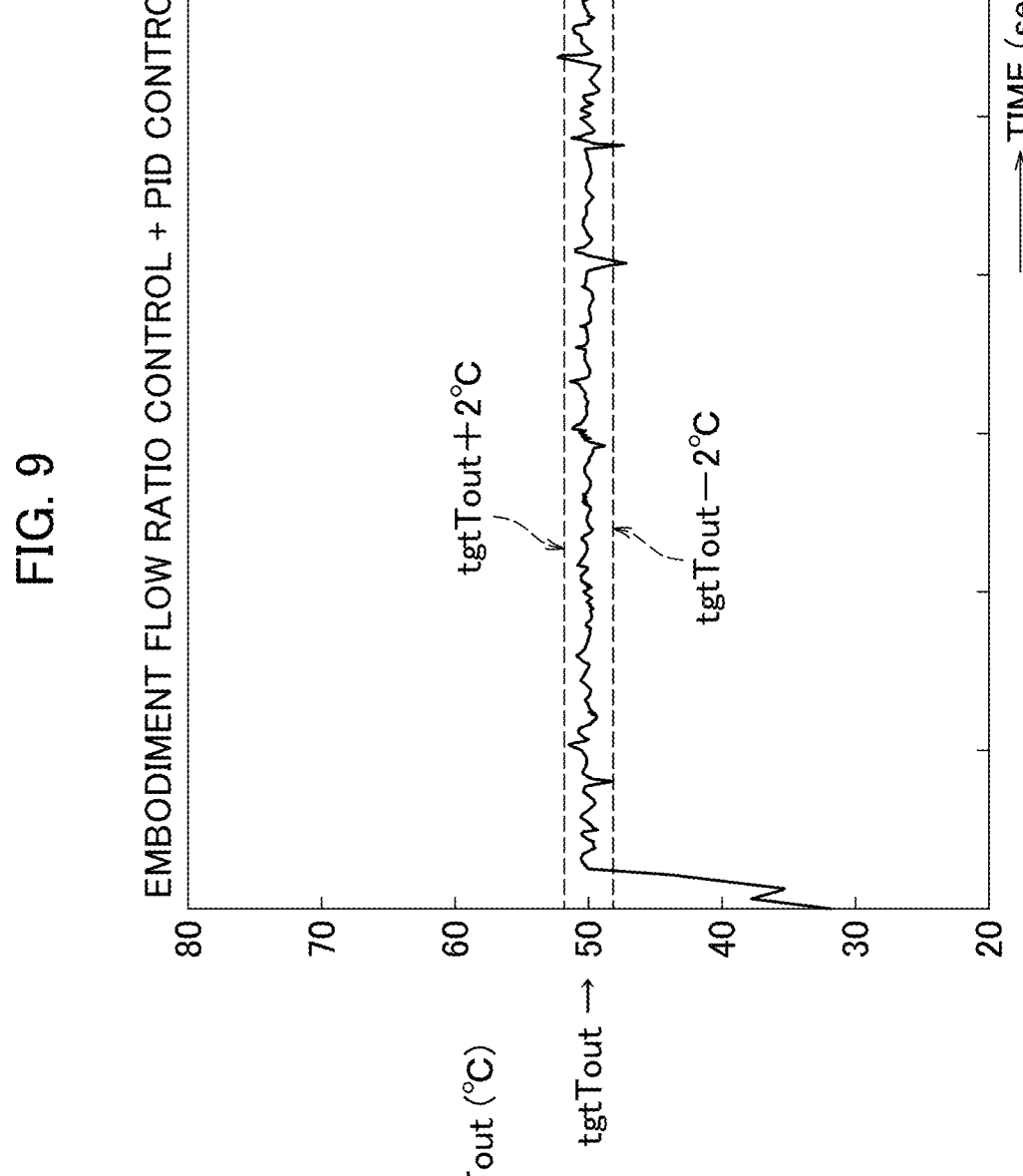
FIG. 9 is a test result illustrating a control status of an outflow temperature when proportional-integral-differential (PID) control is executed in parallel with flow ratio control.
Figure 10:
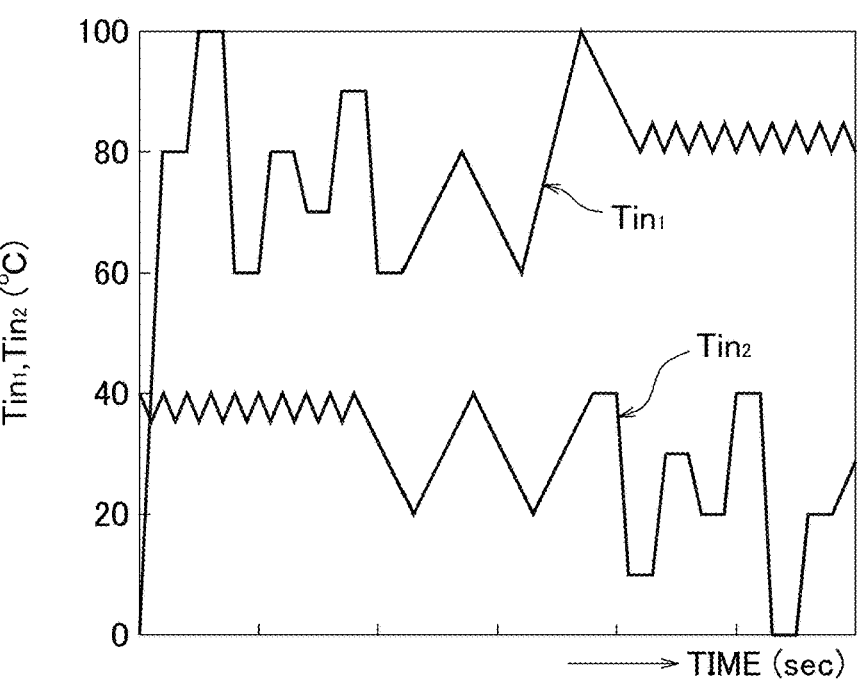
FIG. 10 is a time chart illustrating test conditions regarding an engine-side inflow temperature and a battery-side inflow temperature.

Next, the effects of the temperature adjustment apparatus 1 of the present embodiment will be described. FIG. 9 illustrates the control status of the outflow temperature Tout when PID control is executed in parallel with flow ratio control. As test conditions, as illustrated in FIG. 10, the engine-side inflow temperature Tin1 and the battery-side inflow temperature Tin2 were subjected to random fluctuations. Further, as illustrated in FIG. 11, the rotational speeds of the cooling water pumps 7, 13 on the engine side and the battery side were subjected to periodical fluctuations in mutually opposite directions, thereby fluctuating the respective flow rates of the engine cooling water and the battery cooling water. Under such test conditions, the target outflow temperature tgtTout was set to 50° C., and the actual outflow temperature Tout was measured.

As illustrated in FIG. 9, the outflow temperature Tout is substantially held within a range of about 50±2° C., indicating that the outflow temperature Tout can be controlled with high accuracy. Although the test results also reflect a hunting suppressing effect exerted by derivative (D) control and a steady-state deviation suppressing effect exerted by integral (I) control, it is presumed that the accuracy of controlling the outflow temperature Tout does not deteriorate much even when flow ratio control is executed independently. Note that the "feedback control" of the present invention is not limited to PID control but may be proportional-derivative (PD) or proportional-integral (PI) control because sufficient effects can be obtained even when PD control or PI control is executed, depending on the specifications of the temperature adjustment apparatus 1 including the cooling water circuits.

Figure 12:
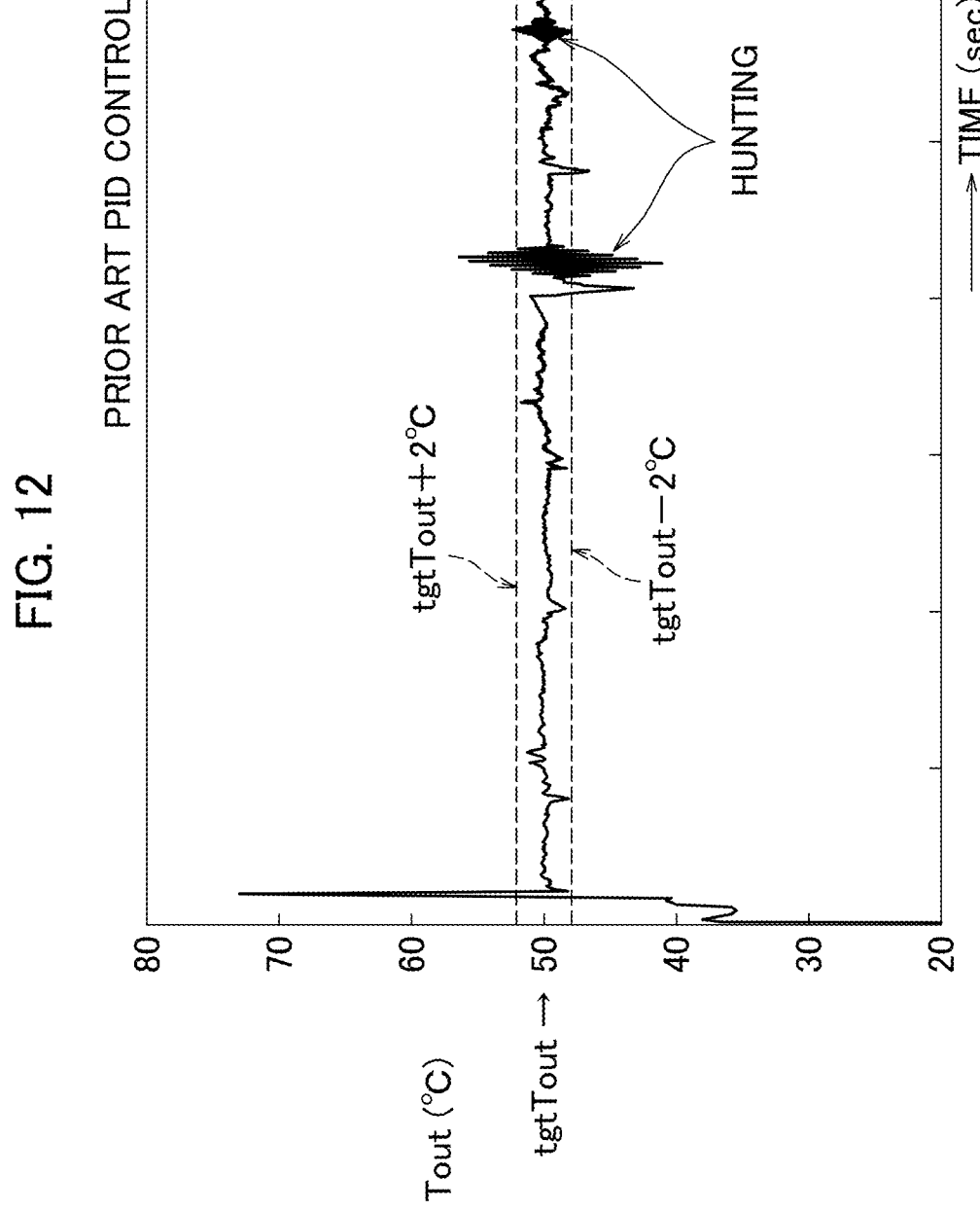
FIG. 12 is a test result illustrating a control status of an outflow temperature using general PID control.

FIG. 12 illustrates the control status of the outflow temperature Tout using general PID control in which the opening degree θ of the mixing valve 16 is fed back based on the deviation ΔT between the target outflow temperature tgtTout and the outflow temperature Tout without executing flow ratio control. FIGS. 10 and 11 are set as test conditions as in FIGS. 9 and 7. Compared to FIG. 9, significant hunting has occurred in the outflow temperature Tout, indicating poor robustness against flow rate fluctuations. It is also assumed that the control accuracy is not as high as when the flow ratio control of the present embodiment is executed independently. Accordingly, only flow ratio control may be executed independently without executing PID control in parallel, and such an aspect is also included in the present invention.

When the control by the engine temperature control unit 18 and the battery temperature control unit 19 is performed in parallel with flow ratio control, the temperatures of the engine cooling water and the battery cooling water constantly fluctuate, and the respective flow rates constantly fluctuate together with the rotational speed of the cooling water pumps 7, 13. The test result illustrated in FIG. 9 can be regarded as evidence that the outflow temperature Tout can be properly controlled even in such a situation.

In Patent Literature 1, details were unclear on controlling the opening degree of the switching valve, the rotation of the pump, and other factors during the mixing of the engine cooling water and the battery cooling water. In contrast, in the present embodiment, the above description clarifies the details of controlling the opening degree of the mixing valve 16, and also shows that the outflow temperature Tout can be controlled more properly by controlling the opening degree of the mixing valve 16, for example, regardless of the details of controlling the rotation of the cooling water pumps 7, 13. As a result, according to the flow ratio control of the present embodiment, the engine cooling water and the battery cooling water can be properly mixed using the mixing valve 16 and effectively utilized for warming the travel battery 5.

Meanwhile, the feature of the flow ratio control of the present embodiment is simply expressed as follows: the opening degree correction coefficient K is calculated based on the flow ratio R and the opening degree θ of the mixing valve 16, and the opening degree of the mixing valve 16 is controlled using the opening degree correction coefficient K as an index. As one piece of information for calculating the flow ratio R and the opening degree correction coefficient K, the engine-side inflow temperature Tin1, the battery-side inflow temperature Tin2, and the outflow temperature Tout are used.

For example, as a method for controlling the opening degree of the mixing valve 16, it is conceivable to detect the respective flow rates of the engine cooling water flowing into the mixing valve 16, the battery cooling water flowing into the mixing valve 16, and the mixed cooling water flowing out from the mixing valve 16 to the battery cooling water circuit 3, and to control the opening degree of the mixing valve 16 using the relationship between these flow rates and the opening degree θ of the mixing valve 16 as an index. However, compared to the temperature sensors 22, 24, the flow rate sensor is heavier and requires more space, making its installation in the vehicle difficult. Moreover, the high manufacturing cost of the flow rate sensor contributes to an increase in the cost of the temperature adjustment apparatus 1. In the present embodiment, the opening degree of the mixing valve 16 is controlled based on the temperatures Tin1, Tin2, and Tout as described above, and the temperatures Tin1 and Tout are detected by the temperature sensors 22, 24 that are lighter and smaller than the flow rate sensor. This can improve the ease of installation in the vehicle and reduce the manufacturing cost compared to when the flow rate sensor is used.

For example, the temperature sensors 22, 24 may already be provided in the vehicle for use in controlling the engine temperature control unit 18 and the battery temperature control unit 19. In this case, it is possible to achieve further cost reduction using the detection information from the existing temperature sensors 22, 24. In addition, in the present embodiment, the battery-side inflow temperature Tin2 is calculated based on the rotational speed ratio N1/N2 of the cooling water pumps 7, 13 and the opening degree θ of the mixing valve 16, and the information on the rotational speed ratio N1/N2 is acquired from the existing engine temperature control unit 18 and battery temperature control unit 19. As a result, the battery-side inflow temperature sensor for detecting the battery-side inflow temperature Tin2 can be omitted, thereby achieving a further cost reduction of the temperature adjustment apparatus 1.

The general PID control illustrated in FIG. 12 as described above not only has poor robustness against flow rate fluctuations but also requires switching the PID control gain in response to factors such as the flow fluctuations of the engine cooling water or the battery cooling water. This causes a problem of an enormous amount of time and effort being required for prior calibration to set a large number of gains.

This problem also occurs, for example, in a method of calculating the target opening degree tgtθ of the mixing valve 16 based on a preset control map. To establish such control, a large number of control maps are required in consideration of various factors such as the respective flow rates of the engine cooling water, the battery cooling water, and the mixed cooling water. Thus, as in the case of general PID control, an enormous amount of time and effort is required for prior calibration.

In contrast, in the flow ratio control according to the present embodiment, the temperatures Tin1, Tin2, and Tout of each cooling water and the opening degree θ are detected as values reflecting the specifications of the cooling water circuits 2, 3, the mixing valve 16, and other components constituting the temperature adjustment apparatus 1. Based on the opening degree correction coefficient K calculated from these values, the opening degree of the mixing valve 16 is controlled. Therefore, since there is no need to set the PID control gain or control map, no prior calibration is required.

Furthermore, even when the specifications of the temperature adjustment apparatus 1 are changed, no calibration is required to reset the gain and the control map. Even among temperature adjustment apparatuses 1 with the same specifications, there are individual differences due to manufacturing errors or the like in each unit. However, since the opening degree correction coefficient K reflects the individual differences, it is also possible to obtain an effect that the opening degree of the mixing valve 16 can be controlled more suitably without being affected by the individual differences.

Meanwhile, the flow ratio control of the present embodiment is repeated at each control interval of the controller 17, so that high control responsiveness can be realized. When the control by the engine temperature control unit 18 and the battery temperature control unit 19 is performed in parallel with flow ratio control as described above, fluctuations in the temperatures and flow rates of the engine cooling water and the battery cooling water are significantly higher than when these controls are not performed. However, as described above based on the test result of FIG. 9, even in such a situation, the outflow temperature Tout can be properly controlled by following fluctuations in the temperature and flow rate of each cooling water. This is because the flow ratio R corresponding to fluctuations in the temperature and flow rate of each cooling water, and thus the opening degree correction coefficient K, are sequentially calculated in real time using flow ratio control at each control interval, and are reflected in the opening degree control of the mixing valve 16 without delay.

As a result, flow ratio control can be accurately executed not only when the control by the engine temperature control unit 18 and the battery temperature control unit 19 is discontinued, but also when the temperature and the flow rate of each cooling water fluctuate with the execution of each control. This means that there is an increased opportunity that the heat of the engine cooling water can be effectively utilized for warming the travel battery 5. Hence it is possible to, for example, reduce the operating time of the PTC heater 14 by an amount corresponding to the utilization of the heat of the engine cooling water, thereby saving the power consumption of the in-vehicle battery as the power source. However, the present invention is not limited to the above, and for example, flow ratio control may be executed periodically at predetermined time intervals. Alternatively, flow ratio control may be executed once when the warming of the travel battery 5 is requested, and then flow ratio control may be executed as necessary when the deviation between the outflow temperature Tout and the target outflow temperature tgtTout increases. These aspects are also included in the present invention.

Further, in the present embodiment, the flow ratio R, and thus the battery-side inflow temperature Tin2, can be calculated not only when the mixing valve 16 has a linear opening degree characteristic but also when the mixing valve 16 has a nonlinear opening degree characteristic. More specifically, based on the knowledge that a linear correlation holds between the rotational speed ratio N1/N2 and the ratio R/Rideal, the ratio R/Rideal is first calculated from the rotational speed ratio N1/N2 according to Approximate Equation (4) based on the test result. Then, after the ideal flow ratio Rideal has been calculated from the opening degree θ of the mixing valve 16, the flow ratio R is calculated according to the above Equation (5), and the battery-side inflow temperature Tin2 is calculated according to the above Equation (6). Therefore, the battery-side inflow temperature Tin2 can be calculated regardless of the opening degree characteristic of the mixing valve 16 to be used, and this can be applied to the opening degree control of the mixing valve 16.

Furthermore, this is also possible not only when the correlation between the rotational speed ratio N1/N2 and the ratio R/Rideal is linear but also when the correlation is nonlinear. More specifically, when the correlation is nonlinear, for example, by applying Approximate Equation (7) instead of Approximate Equation (4), the ratio R/Rideal can be calculated from the rotational speed ratio N1/N2 without any problem. Although the correlation between the rotational speed ratio N1/N2 and the ratio R/Rideal also changes depending on the specification of the mixing valve 16, the battery-side inflow temperature Tin2 can be calculated and applied to the opening degree control of the mixing valve 16 regardless of these conditions.

In the present embodiment, the "powertrain" of the present invention is the engine 4, and the "powertrain cooling water circuit" of the present invention is the engine cooling water circuit 2, but the present invention is not limited to this. For example, when the present invention is applied to an electric vehicle with a motor installed as a travel power source, in-vehicle devices such as a travel motor, an inverter, and a DC-DC converter, which generate heat with operation, may be used as the "powertrain" of the present invention, and a "powertrain cooling water circuit" may be composed of a cooling water circuit for adjusting the temperature of these in-vehicle devices. No repeated description will be made, but in this case as well, similarly to the present embodiment, the heat of the powertrain cooling water can be effectively utilized for warming the travel battery 5.

Further, in the present embodiment, the travel battery 5 has been warmed by utilizing the heat of the engine cooling water, but conversely, the engine 4 may be warmed by utilizing the heat of the battery cooling water. In this Alternative Example 1, since the cooling water to be controlled is engine cooling water, the outflow temperature sensor 24 is relocated to the engine cooling water circuit 2 side, and the temperature of the mixed cooling water flowing out of the mixing valve 16 to the engine cooling water circuit 2 is detected as the outflow temperature Tout. In step S31 of FIG. 8, the target outflow temperature tgtTout is calculated as the target value of the outflow temperature Tout, which can hold the engine 4 in the suitable temperature range, based on the engine temperature and other factors. In the flowcharts of FIGS. 7 and 8, the engine-side inflow temperature Tin1 and the battery-side inflow temperature Tin2 are replaced with each other. For example, in step S13 of FIG. 7, it is determined whether the battery-side inflow temperature Tin2 is equal to or higher than the target outflow temperature tgtTout. This enables the heat of the battery cooling water to be effectively utilized for warming the engine 4.

In this Alternative Example 1, the engine cooling water circuit 2 corresponds to the "second temperature adjustment circuit" and the "powertrain cooling water circuit" of the present invention, the battery cooling water circuit 3 corresponds to the "first temperature adjustment circuit" of the present invention, the engine 4 corresponds to the "second in-vehicle device" and the "powertrain" of the present invention, and the travel battery 5 corresponds to the "first in-vehicle device" of the present invention. The cooling water corresponds to the "heat medium" of the present invention, the engine cooling water corresponds to the "second heat medium" of the present invention, and the battery cooling water corresponds to the "first heat medium" of the present invention.

The engine-side inflow temperature sensor 22 that detects the engine-side inflow temperature Tin1 corresponds to "the second inflow temperature detection unit detecting the second inflow temperature" of the present invention, and the battery-side inflow temperature sensor 23 that detects the battery-side inflow temperature Tin2 corresponds to "the first inflow temperature detection unit detecting the first inflow temperature" of the present invention. The outflow temperature sensor 24 that detects the outflow temperature Tout of the mixed cooling water flowing out to the engine cooling water circuit 2 corresponds to "the outflow temperature detection unit detecting the outflow temperature of the mixed heat medium" of the present invention.

Furthermore, by combining the control according to the present embodiment and the control according to Alternative Example 1, the heat of the engine cooling water and the heat of the battery cooling water may be mutually utilized to warm the travel battery 5 and the engine 4. In the present embodiment, the temperature of the travel battery 5 has been raised utilizing the heat of the engine cooling water, but the travel battery 5 may need to be cooled, and in this case, the travel battery 5 may be cooled utilizing the cooling energy of the engine cooling water. In the case of this Alternative Example 2, it is determined in step S12 of FIG. 7 whether the outflow temperature Tout is equal to or more than the target outflow temperature tgtTout, and when the determination is Yes, it is determined that the cooling of the travel battery 5 is required, and the process proceeds to step S13 to determine whether the engine-side inflow temperature Tin1 is less than the target outflow temperature tgtTout. When the determination is Yes, it is assumed that the engine cooling water has the cooling energy capable of cooling the travel battery 5, and the travel battery 5 may be cooled by executing the processes from step S16. Note that the flowchart of FIG. 8 and the like are the same as those of the embodiment. Contrary to Alternative Example 2, the engine 4 may be cooled by utilizing the cooling energy of the battery cooling water.

Second Embodiment

Next, a second embodiment will be described, where the present invention is embodied in an in-vehicle device temperature adjustment apparatus 31 installed in an electric vehicle. The main difference from the first embodiment is that an air-conditioning core cooling water circuit 32 for adjusting the temperature in the vehicle cabin is provided instead of the engine cooling water circuit 2, and the heat of the cooling water is utilized to warm and cool the travel battery 5. Therefore, parts that share the same configuration with the first embodiment are denoted by the same part reference numerals and omitted from the description, and the differences are described with emphasis. In the following description, the heat utilized for warming the travel battery 5 is referred to as heating energy, and the heat utilized for cooling the travel battery 5 is referred to as cooling energy.

Figure 13:
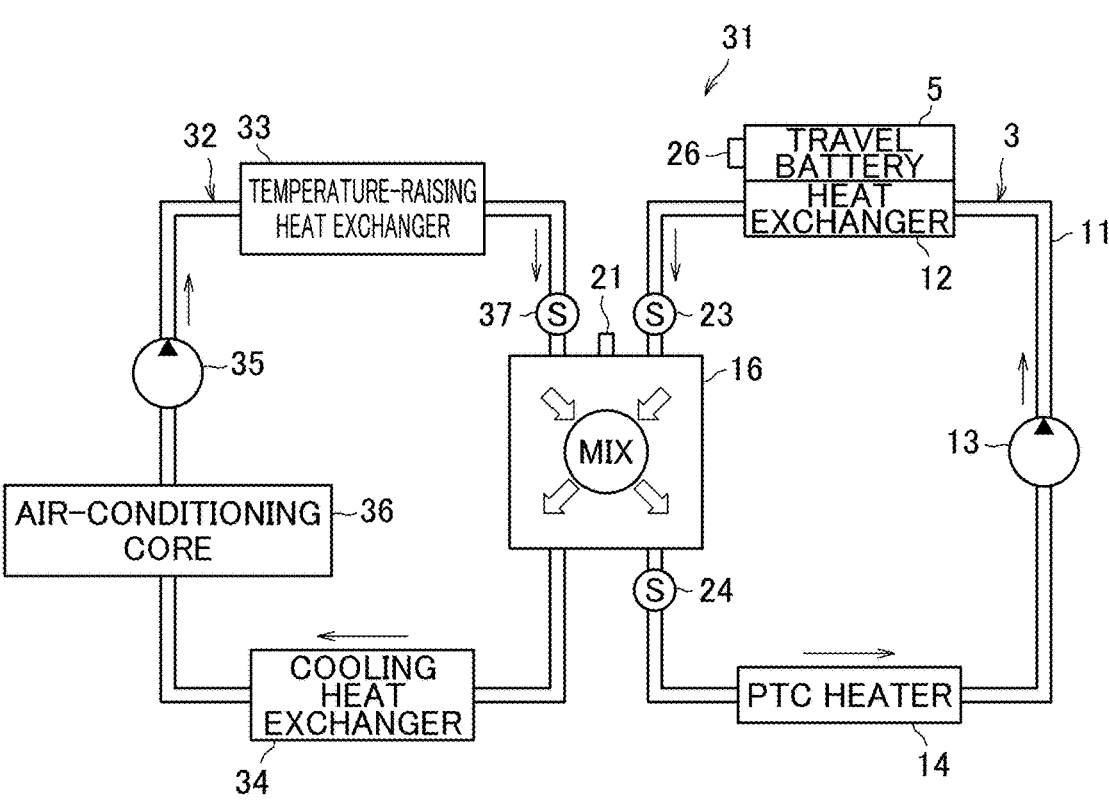
FIG. 13 is a circuit diagram illustrating a temperature adjustment apparatus according to a second embodiment.

FIG. 13 is a circuit diagram illustrating the temperature adjustment apparatus 31 of the present embodiment.

Since the configuration of the battery cooling water circuit 3 is the same as that of the first embodiment, a repeated description will be omitted. A temperature-raising heat exchanger 33, a cooling heat exchanger 34, a cooling water pump 35, and an air-conditioning core 36 are interposed in the annular air-conditioning core cooling water circuit 32. The cooling water discharged from the cooling water pump 35 circulates in the air-conditioning core cooling water circuit 32 as the air-conditioning core cooling water. Although not illustrated, a heat pump system for air-conditioning is installed in the vehicle, and a refrigerant from the heat pump system is utilized to raise or cool the temperature of the air-conditioning core cooling water circulating in the air-conditioning core cooling water circuit 32, thereby heating or cooling the vehicle cabin via the air-conditioning core 36. For example, when heating is required, the refrigerant, increased in temperature by adiabatic compression, is passed through the temperature-raising heat exchanger 33 to increase the temperature of the air-conditioning core cooling water, and air in the vehicle cabin is passed through the high-temperature air-conditioning core 36 to raise its temperature. Further, when cooling is required, the refrigerant, lowered in temperature by adiabatic expansion, is passed through the cooling heat exchanger 34 to cool the air-conditioning core cooling water, and air in the vehicle cabin is passed through the low-temperature air-conditioning core 36 for cooling.

The air-conditioning core cooling water circuit 32 configured as described above is connected to the battery cooling water circuit 3 via the mixing valve 16, thereby constituting the temperature adjustment apparatus 31. In the present embodiment, the air-conditioning core cooling water circuit 32 corresponds to the "first temperature adjustment circuit" of the present invention, the battery cooling water circuit 3 corresponds to the "second temperature adjustment circuit" of the present invention, the air-conditioning core 36 corresponds to the "first in-vehicle device" of the present invention, and the travel battery 5 corresponds to the "second in-vehicle device" of the present invention. The cooling water corresponds to the "heat medium" of the present invention, the air-conditioning core cooling water corresponds to the "first heat medium" of the present invention, and the battery cooling water corresponds to the "second heat medium" of the present invention.

Further, an air-conditioning-core-side inflow temperature sensor 37 is provided instead of the engine-side inflow temperature sensor 22 of the first embodiment, and the temperature of the air-conditioning core cooling water flowing from the air-conditioning core cooling water circuit 32 into the mixing valve 16 is detected as an air-conditioning-core-side inflow temperature Tin3.

Accordingly, the air-conditioning-core-side inflow temperature sensor 37 corresponds to "the first inflow temperature detection unit detecting the first inflow temperature" of the present invention, and the battery-side inflow temperature sensor 23 that detects the battery-side inflow temperature Tin2 corresponds to "the second inflow temperature detection unit detecting the second inflow temperature" of the present invention. The outflow temperature sensor 24 that detects the outflow temperature Tout of the mixed cooling water flowing out to the battery cooling water circuit 3 corresponds to "the outflow temperature detection unit detecting the outflow temperature of the mixed heat medium" of the present invention.

In the routine of FIGS. 7 and 8, the air-conditioning-core-side inflow temperature Tin3 is applied instead of the engine-side inflow temperature Tin1. As a result, the air-conditioning core cooling water and the battery cooling water are properly mixed using the mixing valve 16, so that the heating and cooling energy of the air-conditioning core cooling water can be effectively utilized for warming and cooling the travel battery 5, and other effects can be achieved in the same manner as in the first embodiment.

In the present embodiment, the travel battery 5 has been warmed and cooled by utilizing the heating and cooling energy of the air-conditioning core cooling water, but conversely, the heating and cooling energy of the battery cooling water may be utilized to raise and cool the temperature of the air-conditioning core cooling water. In this case, the outflow temperature sensor 24 is relocated to the air-conditioning core cooling water circuit 32 side, and the temperature of the mixed cooling water flowing out from the mixing valve 16 to the air-conditioning core cooling water circuit 32 is detected as the outflow temperature Tout. The load on the heat pump system is reduced by an amount corresponding to the utilization of the heating and cooling energy of the battery cooling water, making it possible to save the power consumption of the in-vehicle battery that is the power source of the heat pump system.

Third Embodiment

Next, a third embodiment will be described, where the present invention is embodied in an in-vehicle device temperature adjustment apparatus 41 installed in a hybrid vehicle. The temperature adjustment apparatus 41 is a combination of the engine cooling water circuit 2 of the first embodiment and the air-conditioning core cooling water circuit 32 of the second embodiment, and performs a function of warming and cooling the engine 4 by utilizing the heat of the air-conditioning core cooling water. Therefore, parts that share the same configuration are denoted by the same part reference numerals and omitted from the description, and the differences are described with emphasis.

Figure 14:
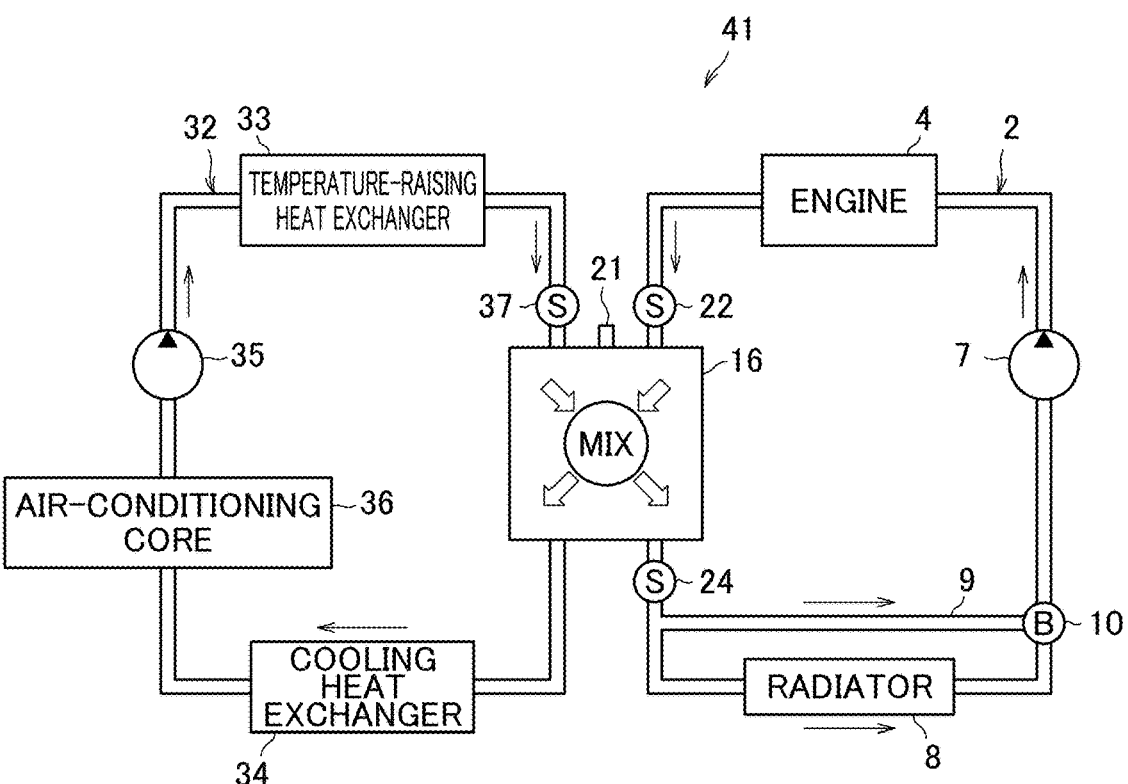
FIG. 14 is a circuit diagram illustrating a temperature adjustment apparatus according to a third embodiment.

FIG. 14 is a circuit diagram illustrating the temperature adjustment apparatus 41 of the present embodiment.

Since the configurations of the engine cooling water circuit 2 and the air-conditioning core cooling water circuit 32 are the same as those of the first and second embodiments, a repeated description will be omitted. In the present embodiment, the air-conditioning core cooling water circuit 32 corresponds to the "first temperature adjustment circuit" of the present invention, the engine cooling water circuit 2 corresponds to the "second temperature adjustment circuit" and the "powertrain cooling water circuit" of the present invention, the air-conditioning core 36 corresponds to the "first in-vehicle device" of the present invention, and the engine 4 corresponds to the "second in-vehicle device" and the "powertrain" of the present invention. The cooling water corresponds to the "heat medium" of the present invention, the air-conditioning core cooling water corresponds to the "first heat medium" of the present invention, and the engine cooling water corresponds to the "second heat medium" of the present invention.

As described above, instead of the engine 4, in-vehicle devices such as a travel motor, an inverter, and a DC-DC converter may be used as the "powertrain" of the present invention, and the "powertrain cooling water circuit" may be composed of a cooling water circuit for adjusting the temperature of these in-vehicle devices.

In the present embodiment, the outflow temperature sensor 24 is provided on the engine cooling water circuit 2 side, and the temperature of the mixed cooling water flowing out from the mixing valve 16 to the engine cooling water circuit 2 is detected as the outflow temperature Tout. At this time, the outflow temperature sensor 24 corresponds to "the outflow temperature detection unit detecting the outflow temperature of the mixed heat medium" of the present invention, the air-conditioning-core-side inflow temperature sensor 37 that detects the air-conditioning-core-side inflow temperature Tin3 corresponds to "the first inflow temperature detection unit detecting the first inflow temperature" of the present invention, and the engine-side inflow temperature sensor 22 that detects the engine-side inflow temperature Tin1 corresponds to "the second inflow temperature detection unit detecting the second inflow temperature" of the present invention.

According to the present embodiment, the air-conditioning core cooling water and the engine cooling water are properly mixed using the mixing valve 16, so that the heating and cooling energy of the air-conditioning core cooling water can be effectively utilized for warming and cooling the engine 4, and other effects can be achieved in the same manner as in the first embodiment.

In the present embodiment, the engine 4 has been warmed and cooled by utilizing the heating and cooling energy of the air-conditioning core cooling water, but conversely, the heating and cooling energy of the engine 4 may be utilized to raise and cool the temperature of the air-conditioning core cooling water. In this case, the outflow temperature sensor 24 is relocated to the air-conditioning core cooling water circuit 32 side, and the temperature of the mixed cooling water flowing out from the mixing valve 16 to the air-conditioning core cooling water circuit 32 is detected as the outflow temperature Tout. The load on the heat pump system is reduced by an amount corresponding to the utilization of the heating and cooling energy of the engine cooling water, making it possible to save the power consumption of the in-vehicle battery that is the power source of the heat pump system.

The aspect of the present invention is not limited to this embodiment. For example, in the first embodiment, the engine cooling water circuit 2 and the battery cooling water circuit 3 have been connected via the mixing valve 16. In the second embodiment, the air-conditioning core cooling water circuit 32 and the battery cooling water circuit 3 have been connected via the mixing valve 16. In the third embodiment, the air-conditioning core cooling water circuit 32 and the engine cooling water circuit 2 have been connected via the mixing valve 16. However, the present invention is not limited to these. For example, the present invention may be applied to a cooling water circuit that adjusts temperatures of in-vehicle devices other than the engine 4, the travel battery 5, and the air-conditioning core 36, or may be composed of a temperature adjustment circuit that circulates a medium other than the cooling water.

Alternatively, for example, the three cooling water circuits 2, 3, 32 may be connected to each other via the mixing valve 16. As an example, in FIG. 1, the air-conditioning core cooling water circuit 32 may be connected to the right side of the battery cooling water circuit 3 via the mixing valve 16, and the heating and cooling energy of the air-conditioning core cooling water may be utilized to warm and cool the travel battery 5 as in the case of the engine cooling water, or a combination of other cooling water circuits may be used.

REFERENCE SIGNS LIST

1, 31, 41 temperature adjustment apparatus
2 engine cooling water circuit (first temperature adjustment circuit, second temperature adjustment circuit, powertrain cooling water circuit)
3 battery cooling water circuit (first temperature adjustment circuit or second temperature adjustment circuit)

4 engine (first in-vehicle device, second in-vehicle device, powertrain)

5 travel battery (first in-vehicle device or second in-vehicle device)

7 cooling water pump (first pump)

13 cooling water pump (second pump)

16 mixing valve

20 mixing control unit

20*a* target outflow temperature calculation unit

20*b* flow ratio calculation unit

20*c* opening degree correction coefficient calculation unit

20*d* target flow ratio calculation unit

20*f* stabilization determination unit

20*g* PID control unit (feedback control unit)

20*l* target opening degree calculation unit

20*j* valve drive unit

20*k* second inflow temperature calculation unit

21 valve opening degree sensor (valve opening degree detection unit)

22 engine-side inflow temperature sensor (first inflow temperature detection unit)

24 outflow temperature sensor (outflow temperature detection unit)

32 air-conditioning core cooling water circuit (first temperature adjustment circuit or second temperature adjustment circuit)

37 air-conditioning-core-side inflow temperature sensor (first inflow temperature detection unit)

What is claimed is:

1. An in-vehicle device temperature adjustment apparatus comprising:

a first temperature adjustment circuit including a first pump configured to circulate a heat medium as a first heat medium to adjust a temperature of a first in-vehicle device;

a second temperature adjustment circuit including a second pump configured to circulate the heat medium as a second heat medium to adjust a temperature of a second in-vehicle device;

a mixing valve mixing the first heat medium flowing in from the first temperature adjustment circuit and the second heat medium flowing in from the second temperature adjustment circuit, at a ratio corresponding to an opening degree, to flow out to each of the first temperature adjustment circuit and the second temperature adjustment circuit as a mixed heat medium;

a valve opening degree sensor detecting the opening degree of the mixing valve;

a first inflow temperature sensor detecting, as a first inflow temperature, a temperature of the first heat medium flowing in from the first temperature adjustment circuit to the mixing valve;

an outflow temperature sensor detecting, as an outflow temperature, a temperature of the mixed heat medium flowing out from the mixing valve to the second temperature adjustment circuit; and a mixing controller performing opening degree control on the mixing valve to mix the first heat medium and the second heat medium, wherein the mixing controller includes a target outflow temperature calculator calculating, as a target outflow temperature, a target value of the outflow temperature based on at least the temperature of the second in-vehicle device, a flow ratio calculator calculating, as a flow ratio, a ratio of the first heat medium contained in the mixed heat medium flowing out from the mixing valve to the second temperature adjustment circuit, based on a rotational speed of the first pump, a rotational speed of the second pump, and the opening degree of the mixing valve, a second inflow temperature calculator calculating, as a second inflow temperature, a temperature of the second heat medium flowing in from the second temperature adjustment circuit to the mixing valve, based on the first inflow temperature, the outflow temperature, and the flow ratio, an opening degree correction coefficient calculator calculating an opening degree correction coefficient defining a relationship between the flow ratio and the opening degree, based on the flow ratio and the opening degree of the mixing valve, a target flow ratio calculator calculating, as a target flow ratio, a target value of the flow ratio based on the first inflow temperature, the second inflow temperature, and the target outflow temperature, a target opening degree calculator calculating a target opening degree of the mixing valve based on the opening degree correction coefficient and the target flow ratio, and a valve drive unit performing opening degree control on the mixing valve based on the target opening degree.

2. The in-vehicle device temperature adjustment apparatus according to claim 1, wherein the flow ratio calculator calculates the flow ratio based on a relationship between a preset rotational speed ratio of the first pump and the second pump and the opening degree of the mixing valve, and when the flow ratio is R, the first inflow temperature is Tin1, the second inflow temperature is Tin2, and the outflow temperature is Tout, the second inflow temperature calculator calculates the second inflow temperature Tin2 in accordance with the Equation below:

$$Tin2 = \frac{Tout - Tin1 \times R}{(1-R)}.$$

3. The in-vehicle device temperature adjustment apparatus according to claim 1, wherein when a ratio N1/N2 between the rotational speed N1 of the first pump and the rotational speed N2 of the second pump is x, the flow ratio is R, a ratio R/Rideal between the flow ratio R and an ideal flow ratio Rideal at a time of flow rates of the first heat medium and the second heat medium being equal is y, and preset coefficients are a and b, the flow ratio calculator calculates the ratio y according to:

$$y = a \times x + b,$$

and calculates the ideal flow ratio Rideal from the opening degree of the mixing valve based on a relationship between a preset opening degree of the mixing valve and the ideal flow ratio Rideal, and calculates the flow ratio R according to:

$$R = y \times Rideal,$$

when the first inflow temperature is Tin1, the second inflow temperature is Tin2, and the outflow temperature is Tout, the second inflow temperature calculator calculates the second inflow temperature Tin2 according to:

$$Tin2 = \frac{Tout - Tin1 \times R}{(1-R)}.$$

4. The in-vehicle device temperature adjustment apparatus according to claim 1, wherein when a ratio N1/N2 between the rotational speed N1 of the first pump and the rotational speed N2 of the second pump is x, the flow ratio is R, a ratio R/Rideal between the flow ratio R and an ideal flow ratio Rideal at a time of flow rates of the first heat medium and the second heat medium being equal is y, and preset coefficients are c, d, and e, the flow ratio calculator calculates the ratio y according to:

$$y = cx^2 + dx + e,$$

and calculates the ideal flow ratio Rideal from the opening degree of the mixing valve based on a relationship between a preset opening degree of the mixing valve and the ideal flow ratio Rideal, and calculates the flow ratio R according to:

$$R = y \times Rideal,$$

when the first inflow temperature is Tin1, the second inflow temperature is Tin2, and the outflow temperature is Tout, the second inflow temperature calculator calculates the second inflow temperature Tin2 according to:

$$Tin2 = \frac{Tout - Tin1 \times R}{(1-R)}.$$

5. The in-vehicle device temperature adjustment apparatus according to claim 3, wherein the flow ratio calculator sets the ideal flow ratio Rideal as the flow ratio R when the ratio x is 1, and applies, to:

$$y = a \times x + b,$$

the coefficients a and b that are each different between a case where x is less than 1 and a case where x is greater than 1.

6. The in-vehicle device temperature adjustment apparatus according to claim 4, wherein the flow ratio calculator sets the ideal flow ratio Rideal as the flow ratio R when the ratio x is 1, and applies, to:

$$Ry = cx^2 + dx + e,$$

the coefficients c, d, and e that are each different between a case where x is less than 1 and a case where x is greater than 1.

7. The in-vehicle device temperature adjustment apparatus according to claim 1, wherein the flow ratio calculator acquires the rotational speed of the first pump and the rotational speed of the second pump from an existing external apparatus.

8. The in-vehicle device temperature adjustment apparatus according to claim 1, wherein the target outflow temperature calculator, the flow ratio calculator, the second inflow temperature calculator, the opening degree correction coefficient calculator, the target flow ratio calculator, the target opening degree calculator, and the valve drive unit repeat respective processes at predetermined control intervals.

9. The in-vehicle device temperature adjustment apparatus according to claim 1, wherein the mixing controller further includes a stabilization determiner determining whether a mixed state of the first heat medium and the second heat medium corresponding to the opening degree control of the mixing valve has been within a predetermined fluctuation range over a predetermined period of time, and a feedback controller executing feedback control including at least one of an integral term or a differential term, obtained from a deviation between the outflow temperature and the target outflow temperature, and the feedback controller starts the feedback control when the stabilization determiner determines that the outflow temperature has been within a predetermined fluctuation range over a predetermined period of time after starting of the opening degree control of the mixing valve.

10. The in-vehicle device temperature adjustment apparatus according to claim 9, wherein the mixing controller controls the opening degree of the mixing valve to warm the second in-vehicle device when the outflow temperature is lower than the target outflow temperature and the first inflow temperature is equal to or higher than the target outflow temperature.

11. The in-vehicle device temperature adjustment apparatus according to claim 9, wherein the mixing controller controls the opening degree of the mixing valve to cool the second in-vehicle device when the outflow temperature is equal to or higher than the target outflow temperature and the first inflow temperature is lower than the target outflow temperature.

12. The in-vehicle device temperature adjustment apparatus according to claim 1, wherein one of the first temperature adjustment circuit and the second temperature adjustment circuit is a powertrain cooling water circuit that adjusts a temperature of a powertrain for controlling a vehicle to travel, and the other of the first temperature adjustment circuit and the second temperature adjustment circuit is a battery cooling water circuit for adjusting a temperature of a travel battery.

13. The in-vehicle device temperature adjustment apparatus according to claim 1, wherein one of the first temperature adjustment circuit and the second temperature adjustment circuit is an air-conditioning core cooling water circuit for adjusting a temperature of an air-conditioning core of a vehicle, and the other of the first temperature adjustment circuit and the second temperature adjustment circuit is a battery cooling water circuit for adjusting a temperature of a travel battery.

14. The in-vehicle device temperature adjustment apparatus according to claim 1, wherein one of the first temperature adjustment circuit and the second temperature adjustment circuit is an air-conditioning core cooling water circuit for adjusting a temperature of an air-conditioning core of a vehicle, and the other of the first temperature adjustment circuit and the second temperature adjustment circuit is a powertrain cooling water circuit for adjusting a temperature of a powertrain for controlling the vehicle to travel.

15. The in-vehicle device temperature adjustment apparatus according to claim 12, wherein the powertrain is an engine installed in the vehicle as a travel power source.

16. The in-vehicle device temperature adjustment apparatus according to claim 12, wherein the powertrain includes a travel motor installed in the vehicle as a travel power source, an inverter for driving the travel motor, and a direct current to direct current (DC-DC) converter.

17. The in-vehicle device temperature adjustment apparatus according to claim 14, wherein the powertrain is an engine installed in the vehicle as a travel power source.

18. The in-vehicle device temperature adjustment apparatus according to claim 14, wherein the powertrain includes a travel motor installed in the vehicle as a travel power source, an inverter for driving the travel motor, and a direct current to direct current (DC-DC) converter.

* * * * *